United States Patent
Durrant et al.

(10) Patent No.: US 10,976,223 B2
(45) Date of Patent: Apr. 13, 2021

(54) METHODS AND COMPOSITIONS FOR REMOVING OR REDUCING FORMATION OF PRECIPITATES GENERATED IN HEMATOXYLIN SOLUTIONS

(71) Applicant: Ventana Medical Systems, Inc., Tucson, AZ (US)

(72) Inventors: Edward E. Durrant, Oro Valley, AZ (US); Henning Groll, Tucson, AZ (US); Casey A. Kernag, Tucson, AZ (US); Charles H. Weidner, Tucson, AZ (US); Kenneth S. Weir, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 362 days.

(21) Appl. No.: 15/816,992

(22) Filed: Nov. 17, 2017

(65) Prior Publication Data
US 2018/0172563 A1 Jun. 21, 2018

Related U.S. Application Data

(63) Continuation of application No. PCT/EP2016/060804, filed on May 13, 2016.

(60) Provisional application No. 62/165,631, filed on May 22, 2015.

(51) Int. Cl.
| | |
|---|---|
| *G01N 1/30* | (2006.01) |
| *G01N 1/31* | (2006.01) |
| *C09B 67/10* | (2006.01) |
| *C09B 67/14* | (2006.01) |
| *G01N 35/10* | (2006.01) |
| *G01N 35/00* | (2006.01) |

(52) U.S. Cl.
CPC .......... *G01N 1/30* (2013.01); *C09B 67/0014* (2013.01); *C09B 67/0017* (2013.01); *G01N 1/312* (2013.01); *G01N 35/1002* (2013.01); *G01N 35/1004* (2013.01); *G01N 2001/302* (2013.01); *G01N 2035/00138* (2013.01); *G01N 2035/00277* (2013.01)

(58) Field of Classification Search
CPC ....... G01N 1/30; G01N 2001/302; G01N 1/31
See application file for complete search history.

(56) References Cited

U.S. PATENT DOCUMENTS

| | | | |
|---|---|---|---|
| 4,816,244 | A | 3/1989 | Starkweather |
| 8,551,731 | B2 | 10/2013 | Kosmeder et al. |
| 2013/0122534 | A1 | 5/2013 | Lim et al. |
| 2013/0203109 | A1 | 8/2013 | Hansen et al. |
| 2013/0302852 | A1 | 11/2013 | Barnes et al. |
| 2014/0329270 | A1 | 11/2014 | Favaloro et al. |

FOREIGN PATENT DOCUMENTS

| | | | |
|---|---|---|---|
| CA | 2941801 | * | 11/2015 |
| CN | 103694732 | | 4/2014 |
| WO | 2008112993 A1 | | 9/2008 |
| WO | 2013071357 A2 | | 5/2013 |
| WO | 2015165850 A1 | | 11/2015 |

OTHER PUBLICATIONS

Magda Havas "A Hematoxylin Staining Technique to Locate Sites of Aluminum Binding in Aquatic Plants and Animals." Water, Air, and Soil Pollution 30 (1986) 735-741. (Year: 1986).*
StainsFile "Ripening Hematoxylin" http://stainsfile.info/stain/hematoxylin/ripen.htm, 3 pgs, Jan. 2020 (Year: 2010).*
Gage, Simon Henry, An Aqueous Solution of Hematoxylin Which Does Not Readily Deteriorate, Proceedings of the American Microscopical Society, Jan. 1893, pp. 125-127, vol. 14, No. 2, Fifteenth Annual Meeting, Part II, Wiley.
International Search Report dated Oct. 24, 2016 in corresponding PCT/EP2016/060804 filed May 13, 2016, 20 pgs.

* cited by examiner

*Primary Examiner* — Thane Underdahl
(74) *Attorney, Agent, or Firm* — Ventana Medical Systems, Inc.

(57) ABSTRACT

Methods and compositions for removing precipitates or reducing the formation of precipitates generated in hematoxylin solutions. The methods and compositions feature cleaning solutions that feature chemical compounds that initiate processes including but not limited to acidification of the waste solution, chelation of metal ions in the waste solution, reduction reactions, oxidation reactions, and metal salt addition reactions.

29 Claims, 4 Drawing Sheets

METHODS AND COMPOSITIONS FOR REMOVING OR REDUCING FORMATION OF PRECIPITATES GENERATED IN HEMATOXYLIN SOLUTIONS

CROSS-REFERENCE TO RELATED APPLICATIONS

This is a continuation of PCT/EP2016/060804, filed May 13, 2016, which claims the benefit of U.S. Provisional Patent Application No. 62/165,631, filed May 22, 2015, the content of each of which is hereby incorporated by reference in its entirety.

FIELD OF THE INVENTION

The present invention relates to hematoxylin solutions used for tissue stains, more particularly to compositions and methods for removing or reducing the formation of precipitates in hematoxylin solutions.

BACKGROUND OF THE INVENTION

Hematoxylin solutions used for diagnostic tissue staining often form precipitates, which may interfere with the staining process or the function or one or more components in an automated stainer machine. In an anatomical pathology laboratory that performs linear or manual staining, the precipitate can be filtered from the solution (and the filtrate can be reused for staining), or old solution can simply be replaced with new solution. Any precipitate on the surfaces of the containers used to hold the solution can be removed by chemical cleaning methods, or old containers can be replaced with new ones.

With respect to automated H&E staining modules, hematoxylin precipitate buildup on surfaces of tubing, valves, dispense manifolds, and other components can have impacts ranging from on-slide precipitate deposition to interference or occlusion of hematoxylin dispenser components. Thus, hematoxylin precipitate could impact the diagnostic utility of the stain as well as necessitate the replacement of parts of the automatic staining module.

Typically, a cleaning solution (e.g., a cleaning solution that can dissolve the precipitate) is used. The chemical makeup and physical properties of this cleaning solution is typically tailored to the design of the staining module, such that the solution is compatible with the materials that comprise the various parts of the module. Traditional cleaning solutions for the removal of hematoxylin precipitate are generally modeled on 'acid alcohol,' whose composition comprises a low percentage of hydrochloric acid (e.g., 1-2%) in an ethanol-water mixture (e.g., typically 70% ethanol, 30% water). A similar solution (e.g., "ACS," or ATLAS Cleaning Solution) has been formulated for an automated slide stainer (e.g., ATLAS); ACS is comprised of hydrochloric acid (~1%) in a mixture of propylene glycol and water. The inclusion of a strong acid in this solution drives the solution pH to acidic values (e.g., about pH=1). The low solution pH makes this solution more corrosive and hazardous than a solution with a pH closer to neutral. Also, the solubility of the precipitate in ACS has been determined to be about <15 milligrams/milliliter, and the dissolution rate in the absence of active mixing may be quite low. Further, the contact time of the ACS with the interior parts of the staining module may be quite long (e.g., days) in order to effect total removal of precipitate. A stronger concentration of hydrochloric acid will improve both the rate of dissolution and the total solubility, but this is at the expense of being a more corrosive and hazardous material.

U.S. Pat. Application No. 2013/0302852, U.S. Pat. No. 8,551,731, U.S. Pat. Application No. 2013/0203109, and *Proceedings of the American Microscopical Society* (Vol. 14, No. 2, Fifteenth Annual Meeting, Part II, January 1893, pp. 125-127) describe attempts to prevent precipitation from occurring in the hematoxylin stain during the staining process through methods such as premixing hematein and mordant solutions prior to its application to a biological sample or adding other chemical components to modify the actual hematoxylin stain. While these methods address the hematoxylin stain and the step of staining a sample with hematoxylin stain, it does not appear that they address the complex waste formed from the entire H&E (hematoxylin and eosin) staining process, e.g., a waste that comprises hematoxylin stain, wash buffers, eosin stain, as well as various other components. Nor do they appear to address the precipitate that can become deposited in one or more components of an automated stainer machine. Also, the *Proceedings of the American Microscopical Society* reference describe the use of chloral hydrate to prevent precipitation during staining with hematoxylin stains, and chloral hydrate is a controlled substance (e.g., a schedule IV controlled substance in the United States).

SUMMARY OF THE INVENTION

Inventors surprisingly discovered compositions for reducing or preventing precipitate in hematoxylin waste solution (these compositions can be used for reducing or preventing precipitate in waste containers, lines, or other components of an automated stainer that carry or hold hematoxylin waste). For example, Inventors surprisingly discovered that the addition of phosphate buffer to a hemalum solution improved the shape of the hematein peak in an HPLC analysis. Inventors further investigated other aluminum complexing agents (e.g., citrate, phosphoric acid) and discovered that solutions comprising complexing agents or chelators may be beneficial for the reduction or prevention of precipitate in hematoxylin waste solution.

Inventors also surprisingly discovered the use of metal salt solutions could help to remove precipitate from surfaces such as tubing and valve components during feasibility work done for stabilized, two-part hematoxylin formulations. For example, it was surprisingly discovered that a potassium aluminum sulfate solution used as the mordant component of a two-part hematoxylin was turning purple as a result of interaction with the valve component used to mix the two components together. Subsequent experiments in which the aluminum solution was introduced into tubing that had precipitate on its interior surface indicated that this solution appeared to dissolve the precipitate faster and to a greater extent than the ACS reagent described above. Further work with a variety of metal salt solutions indicated that a ferric chloride solution may also perform this function of dissolving precipitate.

It was also surprisingly discovered that an iron solution was effective in dissolving precipitate, e.g., as compared to an acidified solution.

Without wishing to limit the present invention to any theory or mechanism, it is believed that methods and compositions of the present invention may be beneficial because they may be less corrosive and/or less hazardous as compared to solutions like the ACS reagent described above, or they may work more effectively and/or faster than other solutions such as the ACS reagent.

The present invention features methods and compositions for removing precipitates or reducing (e.g., preventing) the formation of precipitates generated in hematoxylin solutions, which may be present in one or more components of an automated stainer machine (e.g., drain lines, valves, waste trays, etc.). For example, the present invention features cleaning compositions that help to remove the precipitate in hematoxylin solutions or reduce (or prevent) the formation of said precipitate. The present invention also features methods utilizing said cleaning compositions for removing the precipitate in hematoxylin solutions or reducing the formation of the precipitate (or preventing the formation of the precipitate), e.g., for removing or reducing precipitate in components of an automated stainer machine (e.g., drain line, waste tray, valves, etc.). As used herein, the term "remove the precipitate" may refer to removing the precipitate that is present or preventing the precipitate from forming or reducing the precipitate formation. For example, the present invention may feature methods, compositions, and systems for dissolving the precipitate, e.g., dissolving the precipitate that is present. The present invention may also feature methods, compositions, and systems that create conditions that reduce (or prevent) the formation of the precipitate.

The methods and compositions of the present invention may utilize one or more chemical processes including but not limited to acidification, oxidation, metal complexation or chelation, metal salt addition, or reduction.

The methods and compositions of the present invention may be determined based on the composition of the hematoxylin waste solution. For example, the hematoxylin waste solution may vary from one particular automated stainer machine to another, depending on the selected buffers used for the staining process, etc. Thus, a particular cleaning composition may be selected specifically for a particular hematoxylin waste solution that is formed, e.g., the cleaning composition can be tailored to be most effective for the particular hematoxylin waste solution (or most effective for the particular machine, or most effective with respect to any other appropriate parameter, e.g., cost, ease of access to chemicals, etc.).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DETAILED DESCRIPTION OF THE INVENTION

Figure 1A:
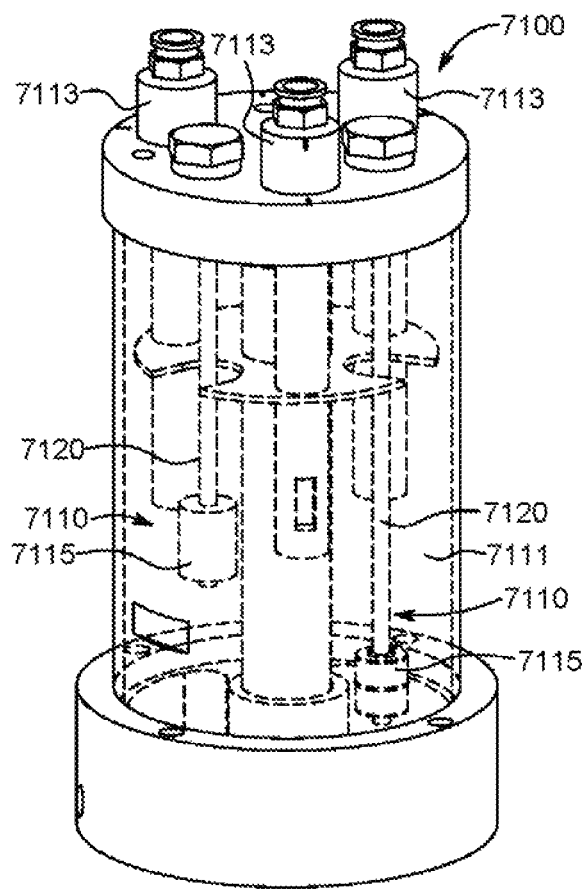
FIG. 1A shows an isometric view of a non-limiting example of a waste container. The waste container 7100 may comprise one or more sensor assemblies 7110 adapted to sense the amount of liquid waste in a chamber 7111. Waste may be delivered through feed tubes 7113 into the chamber 7111. The sensor assemblies 7110 can include sensors 7115 and guide rods 7120 along which sensors 7115 move.

The present invention features systems, methods, and compositions for preventing the formation of precipitate, reducing the amount of precipitate, or removing the precipitate in hematoxylin waste solution. In some embodiments, the systems, methods, and compositions are applied to an automated staining instrument; however, the methods are not limited to use in automated applications. For example, in some embodiments, the systems, methods, and compositions are used to help reduce or remove precipitate formed from hematoxylin waste in one or more components of an automated stainer machine (e.g., see FIG. 1-3, which show non-limiting examples of waste containers or waste systems). Without wishing to limit the present invention to any theory or mechanism, it is believed that the aluminum ions in the hematoxylin solution complex with hematein (e.g., hemalum complex), which precipitates in the solution. The precipitate may also comprise long chains of hemalum, which are insoluble. Shown at FIG. 4 are the structures of hematoxylin and hematein.

The present invention describes cleaning compositions, e.g., chemical additives that are added to the hematoxylin waste solution, that help to reduce or prevent the precipitate in the hematoxylin waste solution. In some embodiments, the cleaning compositions may help to reduce or prevent the precipitate from forming (and possibly depositing a solid film on the surfaces it contacts, e.g., surfaces in an automated stainer machine, e.g., drain lines, waste trays or reservoirs, valves, etc.). In some embodiments, the cleaning compositions may help to dissolve (or remove or clean) precipitate that is already present in the waste solution.

The cleaning compositions described herein may utilize one or more chemical principles such as but not limited to acidification, oxidation, metal complexation or chelation, metal salt addition, or reduction. Without wishing to limit the present invention to any theory or mechanism, it is believed that prevention of precipitate formation, reduction in precipitate formation, or removal of precipitate may allow the surfaces that the waste solution contacts to be cleaned less frequently.

The present invention further relates to methods, systems, and devices for staining biological samples with hematoxylin. As used herein, the term "biological sample" shall refer to any material obtained from a subject capable of being tested for the presence or absence of a biomarker. In some cases, the biological sample is a cellular sample, such as tissue samples and cytological samples. As used herein, the term "cellular sample" refers to any sample containing intact cells, such as cell cultures, bodily fluid samples or surgical specimens taken for pathological, histological, or cytological interpretation. As used herein, the term "tissue sample" shall refer to a cellular sample that preserves the cross-sectional spatial relationship between the cells as they existed within the subject from which the sample was obtained. "Tissue sample" shall encompass both primary tissue samples (i.e. cells and tissues produced by the subject) and xenografts (i.e. foreign cellular samples implanted into a subject). As used herein, the term "cytological sample" refers to a cellular sample in which the cells of the sample have been partially or completely disaggregated, such that the sample no longer reflects the spatial relationship of the cells as they existed in the subject from which the cellular sample was obtained. Examples of cytological samples include tissue scrapings (such as a cervical scraping), fine needle aspirates, samples obtained by lavage of a subject, et cetera. Whenever the term "biological sample" is used herein, it should be understood that this is meant to explicitly include cellular samples, tissue samples, and cytological samples.

I. METHODS AND SYSTEMS

A. Reducing or Removing Precipitate from Hematoxylin Waste Solutions

In an embodiment, methods of reducing precipitate (or preventing the formation of precipitate) or removing or cleaning precipitate in hematoxylin waste is provided by mixing a cleaning composition with the hematoxylin waste. As used herein, "hematoxylin waste" refers to any hematoxylin solution that has already been used in to stain a biological sample. A hematoxylin solution is first contacted with a biological sample under conditions that permit the hematoxylin solution to stain the biological sample. The hematoxylin solution is then removed from the biological sample and mixed with the cleaning solution. The hematoxylin waste may consist of the hematoxylin solution that was used to stain the biological sample(s), or it may comprise the hematoxylin solution be mixed with other agents (for example, a wash solution used to wash the hematoxylin off of the biological sample after staining has been completed). In a so-called "dip-and-dunk" procedure, a reservoir of the hematoxylin solution ("hematoxylin reservoir") is provided, and each biological sample is immersed in the hematoxylin reservoir to allow the sample to be stained with the hematoxylin, and then is transferred to other reagents to complete the staining process. Each hematoxylin reservoir is typically used to stain a plurality of different biological samples. In such a procedure, the hematoxylin waste comprises hematoxylin solution that will no longer be used to stain another biological sample. At this point, the cleaning composition may be introduced into the hematoxylin reservoir, or the hematoxylin waste may be removed from the hematoxylin reservoir and mixed with the cleaning composition at some other area. In a so-called "individual staining procedure," each biological sample is contacted with a fresh hematoxylin solution (i.e., a hematoxylin solution that has not previously been exposed to a different biological sample), and the hematoxylin solution is not shared with other biological samples. In such a procedure, the fresh hematoxylin solution is incubated on the biological sample, and then removed and/or washed off of the biological sample. The hematoxylin waste comprises the hematoxylin solution that has been removed or washed off of the biological sample.

B. Preventing, Reducing, or Removing Hematoxylin Precipitate Accumulation on Objects, Such as Components of Automated Hematoxylin Stainers In another embodiment, a method of preventing build-up of a hematoxylin precipitate on—or cleaning hematoxylin precipitate off of—an object that has been exposed to a hematoxylin solution is provided. The method comprises contacting the object with a cleaning solution as described herein before, during, and/or after exposure of the object to the hematoxylin solution.

In an embodiment, the object is a component of an automated hematoxylin stainer. As used herein, the term "automated hematoxylin stainer" shall refer to any device capable of applying a hematoxylin-based stain to a biological sample in which one or more steps using a hematoxylin stain is automated. In some embodiments, the automated hematoxylin stainer is an automated slide stainer, in which the biological sample is disposed on a microscope slide. Automated slide stainers generally operate on one of two principles: (1) individual staining, in which each slide in the automated slide stainer receives its own aliquot of hematoxylin solution in the staining process; and (2) batch staining, in which a plurality of slides are immersed in the same batch of hematoxylin solution similar to a dip-and-dunk method. A stainer that operates on an individual staining principle shall be referred to herein as an "individual sample stainer". A stainer that operates on a batch staining principle shall be referred to herein as a "batch stainer." Examples of individual sample stainers include the VENTANA SYMPHONY and VENTANA HE series of automated slide stainers from Ventana Medical Systems, Inc. Examples of batch stainers include the COVERSTAINER series of automated slide stainers from Agilent Technologies, and the ST series of stainers from Leica Biosystem Nussloch GmbH. The present methods are useful in automated slide stainers that operate on either principle.

In an embodiment, the component is a component of an individual sample stainer. The staining system of an individual sample stainer typically comprises a source of a fresh hematoxylin solution in fluid communication with a dispenser for depositing the hematoxylin solution on the biological sample. In the context of an individual sample stainer, the term "hematoxylin dispenser" shall refer to the dispenser for depositing the hematoxylin solution on the biological sample. During the staining process, the staining system operates to transfer the fresh hematoxylin system from the source of fresh hematoxylin to the hematoxylin dispenser. The hematoxylin dispenser is positioned in proximity to a biological sample and dispenses a separate predetermined volume of hematoxylin solution onto each biological sample. The hematoxylin solution is then removed from the biological sample, either by action of the hematoxylin waste system or by transferring the hematoxylin solution to a separate region of the stainer (such as a drip tray) that is in fluid communication with the hematoxylin waste system. A staining cycle is completed when the biological samples are removed from the stainer region. In an embodiment, the cleaning solution is dispensed into the staining system before a staining cycle is started and/or after a staining cycle is completed. In such an embodiment, the cleaning composition may be dispensed into the staining system via the hematoxylin dispenser before and/or after the relevant staining cycle. In a specific example, the cleaning composition is a solution, and the cleaning solution is flowed through at least a portion of the fluid path between the source of the fresh hematoxylin solution and the hematoxylin dispenser. Additionally or alternatively, a separate fluid path may be defined to dispense the cleaning composition directly into or onto the hematoxylin dispenser and/or other components of the staining system. As an additional or alternative embodiment, the cleaning solution may be dispensed before, during, or after a relevant staining cycle via a separate dispenser positioned to inject the cleaning composition into or onto components of the staining system that: (1) are disposed between the hematoxylin dispenser and the hematoxylin waste system; and (2) do not come in contact with the biological sample. Injection of the cleaning composition may be repeated every staining cycle or may be repeated less frequently. For components that do not contact the biological sample or the hematoxylin solution before it contacts the biological sample, the cleaning composition may be dispensed periodically or continuously.

In an embodiment, the component is a component of a batch stainer. The staining system of a batch stainer typically comprises a source of fresh hematoxylin solution in fluid communication with a dispenser adapted to deposit the hematoxylin solution into a staining reservoir ("hematoxylin reservoir"). In the context of a batch stainer, the term "hematoxylin dispenser" shall refer to the dispenser for depositing the hematoxylin solution into the hematoxylin reservoir. Staining is conducted by filling the hematoxylin reservoir with hematoxylin solution via the hematoxylin dispenser and then immersing the biological samples in the hematoxylin reservoir. The hematoxylin solution is typically purged from the hematoxylin reservoir after a set number of cycles have been completed or a set number of samples have been stained. In such an embodiment, the cleaning solution may be dispensed into the staining system immediately before, during, and/or immediately after the hematoxylin reservoir is purged. The cleaning composition may be dispensed every time that the hematoxylin reservoir is purged, or it may be done less frequently. In such an embodiment, the cleaning composition may be dispensed into the staining system via the hematoxylin dispenser before and/or after the relevant staining cycle. In a specific example, the cleaning composition is a solution, and the cleaning solution is flowed through at least a portion of the fluid path between the source of the fresh hematoxylin solution and the hematoxylin dispenser. Additionally or alternatively, a separate fluid path may be defined to dispense the cleaning composition directly into or onto the hematoxylin dispenser and/or other components of the staining system.

In an embodiment, the component is a component of a hematoxylin waste system. The hematoxylin waste system typically comprises a mechanism for removing hematoxylin from the staining system. Thus, for example, a waste system for a batch stainer may have a mechanism in place for removing hematoxylin solution from the hematoxylin reservoir used for staining (such as a drainage valve in the reservoir or vacuum nozzle on, in, or in proximity to the hematoxylin reservoir), while a hematoxylin waste system for an individual sample stainer may have a mechanism for removing the hematoxylin solution directly from the biological sample (such as a vacuum nozzle in proximity to the biological sample) and/or for removing the hematoxylin solution from a waste storage area in the stainer system (such as a drainage valve on a drip tray or other device for capturing used hematoxylin solution during the staining process or a vacuum nozzle on, in, or in proximity to such device). The cleaning composition may be introduced into the hematoxylin waste system via the same path as the hematoxylin waste is introduced into the waste system. Additionally or alternatively, the cleaning composition may be injected into or onto different components of the hematoxylin waste system via different paths. Thus, for example, the hematoxylin waste system may contain a waste container and the cleaning solution may be dispensed directly into the waste container via a separate dispenser that is not in the fluid path of the hematoxylin waste solution. The cleaning composition may be injected into the hematoxylin waste system periodically (such as before, during, and. or after a set number of staining cycle, samples stained, or reservoir purges) or continuously.

Figure 1B:
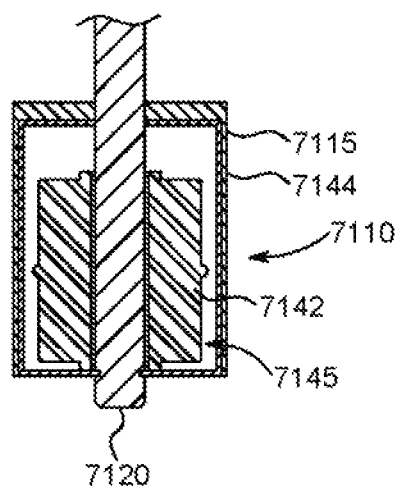
FIG. 1B shows a cross-sectional view of the sensor 7115 of FIG. 1. The sensor 7115 may float to sense the volume of waste held in chamber 7111 and may include a float sensor 7142 and a protective shield 7144. The shield 7144 may keep particles (e.g., precipitate from stain reagent) from entering a sensor chamber 7145. The sensor 7142 and the shield 7144 may side together along the rod 7120 while the protective shield 7144 prevents or limits substances (e.g., particles that can affect operation of the sensor 7142) from entering the chamber 7145.
Figure 2:
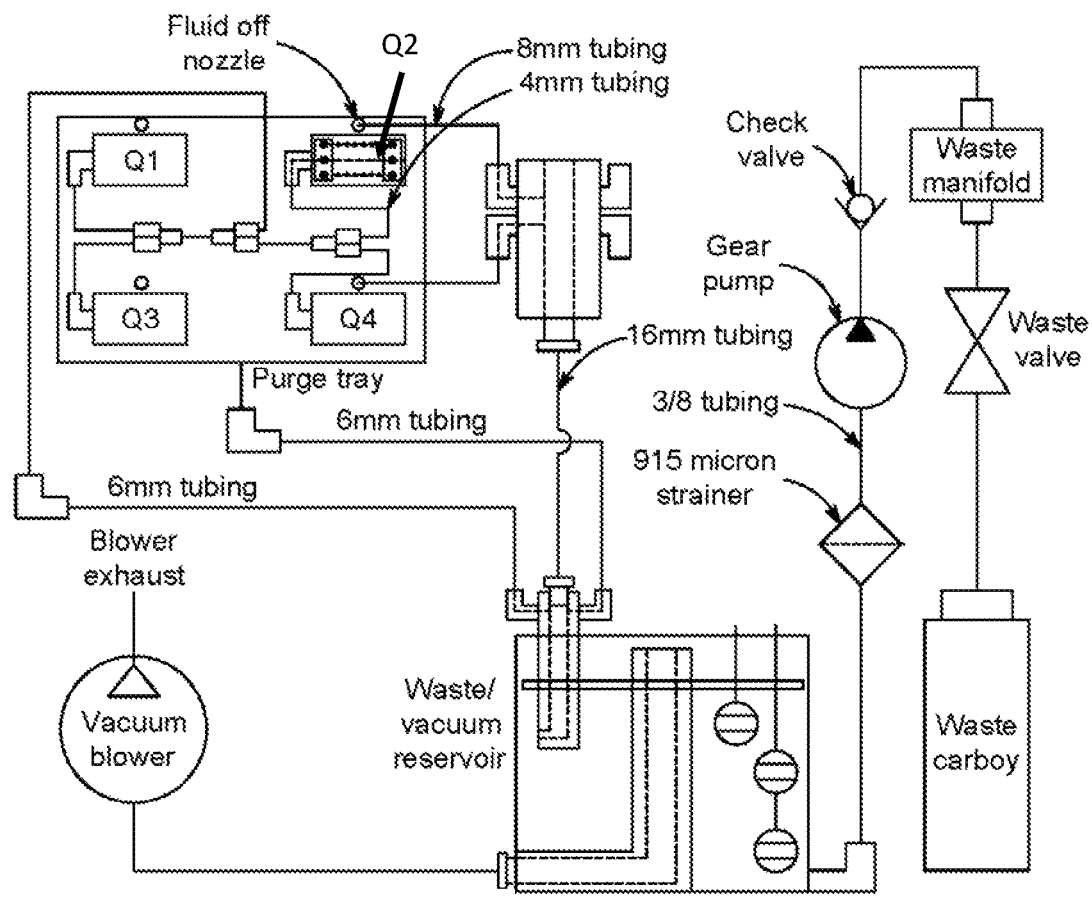
FIG. 2 shows a schematic view of an exemplary hematoxylin waste system of an automated hematoxylin stainer.
Figure 3:
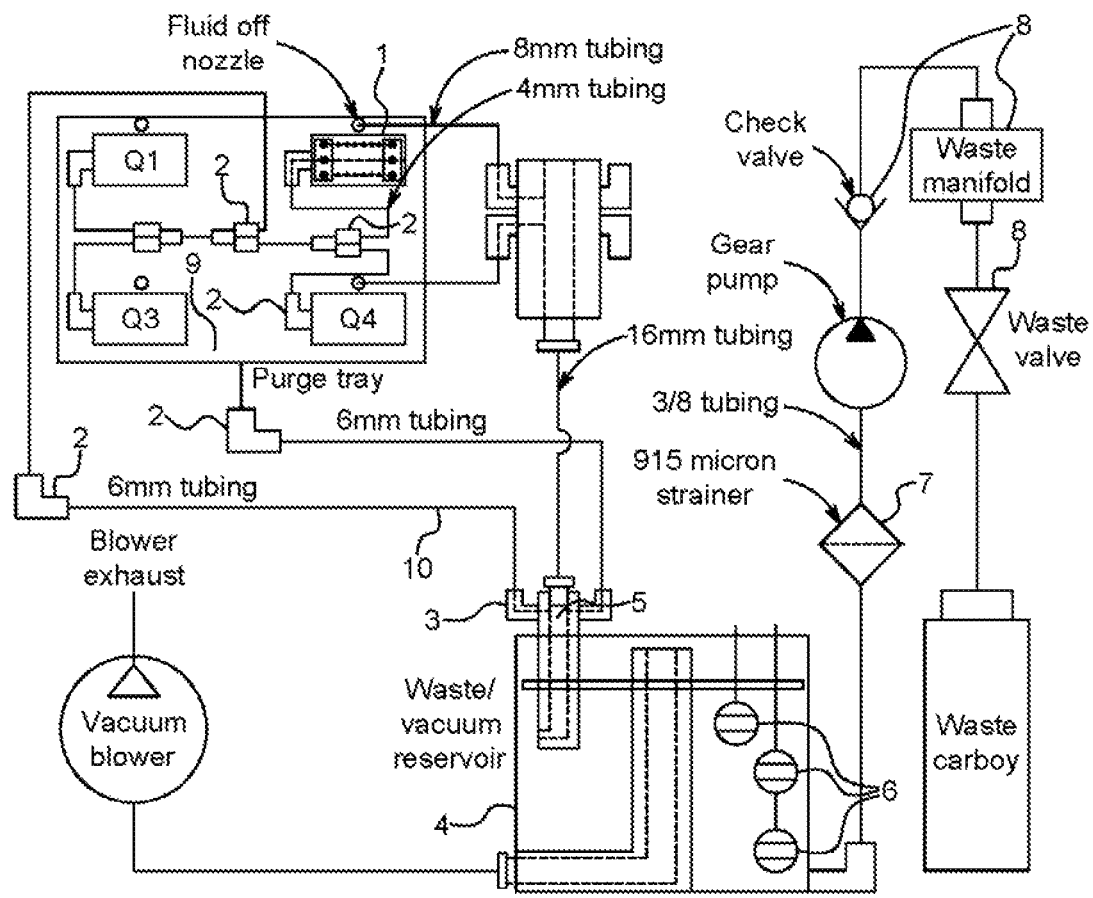
FIG. 3 shows the schematic waste system of FIG. 2, highlighting areas that may accumulate hematoxylin precipitate (illustrated by numbered arrows).
Figure 4:
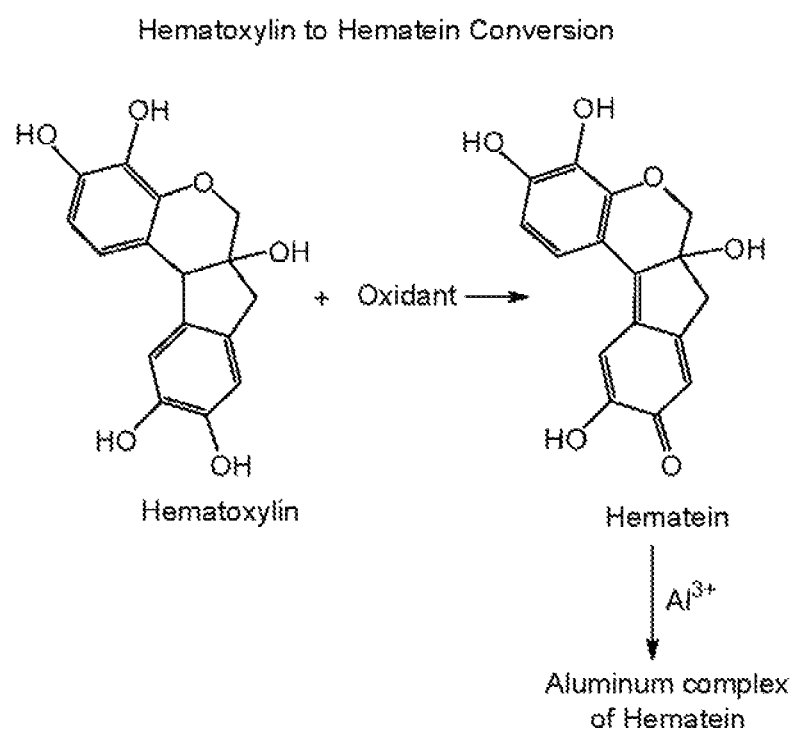
FIG. 4 shows the reaction scheme for conversion of hematoxylin to hematein and subsequent complexation of hematein with aluminum ions.

FIG. 1-3 show non-limiting examples of waste containers and waste systems, e.g., waste systems for an automated stainer machine.

FIG. 2 illustrates an exemplary hematoxylin waste system. One or more dispensers (illustrated as Q1-Q4) are adapted to deposit hematoxylin solution into a staining region of the automated hematoxylin stainer. In individual sample stainers, the dispensers are positioned to deposit the hematoxylin solution onto the biological sample. In batch stainers, the dispensers are positioned to fill a hematoxylin reservoir in which the biological sample will be immersed. Used hematoxylin solution is removed from the stainer region via a waste vacuum and stored in a waste container. The waste vacuum is connected to a plurality of "fluid off nozzles." Activation of the waste vacuum applies suction to the fluid off nozzles, causing the hematoxylin solution to be pulled through tubing and deposited into a waste container (such as the waste container illustrated at FIG. 1). The waste container contains sensors to detect the volume of waste deposited in the waste chamber and, when a predetermined volume is present, a pump is activated to pump the waste out of the waste container and out of the device (for example, into a waste carboy for disposal or directly into a liquid waste stream, such as a sink). Strainers for removing solids and valves and manifolds for controlling and directing fluid flow are frequently present in the waste system as well. The present invention is not limited to the waste system (and components thereof) shown in FIG. 2.

Areas prone to accumulating hematoxylin precipitate are highlighted in FIG. 3. As illustrated therein, the following areas have been observed to accumulated hematoxylin precipitate, or are at risk of doing so:

1 Valves of hematoxylin dispensers;
  2 Fittings for connecting waste vacuums to components of the staining system;
  3 Elbow joints vacuum and waste lines;
  4 Precipitate build-up on surface of waste reservoir;
  5 Precipitate ring formed on the inside of the 16 mm tubing connector;
  6 Floats of waste reservoir covered with sludge (can become non-functional);
  7 Sludge build-up in strainer (filter) can impede the gear pump's ability to evacuate the waste reservoir;
  8 Fluid management devices within the hematoxylin waste system (such as the check valve, the waste manifold, and the waste valve illustrated in FIG. 2) are considered higher risk for precipitate formation;
  9 A strainer within a purge tray of the stainer. Clogging of the strainer with precipitate build-up lead to overflow of the purge tray.
  10 Bends in waste lines.

A cleaning composition of the present invention may be used to clean precipitate formed on a component of such a waste system, including waste valves, manifolds, vacuum lines, vacuum reservoirs, manifold valves, waste trays, tray strainers, waste line strainers, fittings, pump lines, etc. A cleaning composition of the present invention may be used to help prevent precipitate formed on such components. For example, the cleaning composition may be introduced to an automated stainer machine in a particular area that accumulates precipitate or any other area that contacts the hematoxylin stain or hematoxylin waste solution, and/or may be run through the whole hematoxylin waste system.

C. Automated Hematoxylin Stainers and Systems for Staining Biological Samples with Hematoxylin In another embodiment, an automated hematoxylin stainer or a system for staining a biological sample with a hematoxylin solution is provided, said automated hematoxylin stainer or system comprising: (a) a staining system for contacting a biological sample with a hematoxylin solution; and (b) a cleaning system for: (b1) dispensing a cleaning composition as disclosed herein on a component of the hematoxylin stainer that has come in contact with the hematoxylin solution; and/or (b2) mixing a hematoxylin waste solution generated by the staining system with a cleaning composition as disclosed herein.

In an embodiment, the component is a component of a staining system of an individual sample stainer. In an embodiment, the cleaning system is adapted to dispense the cleaning solution is dispensed into the staining system before a staining cycle is started and/or after a staining cycle is completed. In such an embodiment, the cleaning composition may be dispensed into the staining system via the hematoxylin dispenser before and/or after the relevant staining cycle. In a specific example, the cleaning composition is a solution, and the cleaning system is adapted to flow the cleaning composition through at least a portion of the fluid path between a source of fresh hematoxylin solution and a hematoxylin dispenser. Additionally or alternatively, the cleaning system may define a separate fluid path to dispense the cleaning composition directly into or onto the hematoxylin dispenser and/or other components of the staining system. As an additional or alternative embodiment, the cleaning system may be adapted to dispense the cleaning solution before, during, or after a relevant staining cycle via a separate dispenser positioned to inject the cleaning composition into or onto components of the staining system that: (1) are disposed between the hematoxylin dispenser and a hematoxylin waste system; and (2) do not come in contact with the biological sample. The cleaning system may be adapted to dispense the cleaning composition every staining cycle or less frequently. Additionally or alternatively, the cleaning system may be adapted to dispense the cleaning composition periodically or continuously onto or into components that do not contact the biological sample and do not contact the hematoxylin solution before the hematoxylin solution.

In an embodiment, the component is a component of a staining system of a batch stainer. In such an embodiment, the cleaning system may be adapted to dispense the cleaning solution into the staining system immediately before, during, and/or immediately after the hematoxylin reservoir is purged. The cleaning composition may be dispensed every time that the hematoxylin reservoir is purged, or it may be done less frequently. In such an embodiment, the cleaning system may be adapted to dispense the cleaning composition into the staining system via the hematoxylin dispenser. In a specific example, the cleaning composition is a solution, and the cleaning system is adapted to flow the cleaning solution through at least a portion of the fluid path between the source of the fresh hematoxylin solution and the hematoxylin dispenser. Additionally or alternatively, the cleaning system may include a separate fluid path for dispensing the cleaning composition directly into or onto the hematoxylin dispenser and/or other components of the staining system.

In an embodiment, the component is a component of a hematoxylin waste system. The cleaning system may introduce the cleaning composition into the hematoxylin waste system via the same path as the hematoxylin waste is introduced into the waste system. Additionally or alternatively, cleaning system may introduce the cleaning composition into or onto different components of the hematoxylin waste system via different paths. Thus, for example, the hematoxylin waste system may contain a waste container and the cleaning system may introduce the cleaning solution directly into the waste container via a separate dispenser that is not in the fluid path of the hematoxylin waste solution. The cleaning system may introduce the cleaning composition into the hematoxylin waste system periodically (such as before, during, and. or after a set number of staining cycle, samples stained, or reservoir purges) or continuously.

In some embodiments, the method is performed in an automated slide stainer. In some embodiments, the slide stainer comprises a waste tray for the hematoxylin waste solution, and the cleaning composition is dispensed (e.g., via a dispenser, a drain line, etc., e.g., from a cleaning composition reservoir) into the waste tray. In some embodiments, the cleaning composition is dispensed into a hematoxylin waste reservoir (e.g., a reservoir that holds the waste after the waste solution leaves the waste tray). In some embodiments, the cleaning composition is dispensed into both the waste tray and the waste reservoir. In some embodiments, the cleaning composition is added continuously to the hematoxylin waste solution (e.g., in the waste tray, in the waste reservoir, etc.). The addition of the cleaning composition may be done following the use of the hematoxylin solution for staining of a specimen.

In some embodiments, the automated hematoxylin stainer comprises a processor and a memory coupled to the processor, wherein the memory stores computer-readable instructions that, when executed by the processor, cause the processor to perform operations, e.g., operations that instruct the cleaning system to introduce a cleaning composition to the hematoxylin waste solution or a component of the automated hematoxylin stainer that has contacted a hematoxylin solution or a hematoxylin waste solution. For example, in some embodiments, the operations comprise instructing the cleaning composition to be added to the waste tray, to various other locations such as but not limited to the waste reservoir or various dispensers or tubes.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

II. CLEANING COMPOSITIONS

A. Acidification

In some embodiments, the present invention features methods and compositions that acidify the hematoxylin waste solution. For example, the present invention features cleaning compositions comprising an acid. Without wishing to limit the present invention to any theory or mechanism, it is believed that acidification is effective in removing and/or preventing the formation of precipitate (or reducing the formation of precipitate) in hematoxylin waste solution, for example because larger concentration of hydrogen ions in acidic solutions may lead to the replacement of aluminum ions with hydrogen ions in the hemalum species; when this occurs, the hemalum that makes up the hematoxylin precipitate may then be altered so as to be soluble (e.g., an be unable to form a precipitate in the first place), or if the hemalum is in a long chain (that is insoluble), the chain may be broken to render the hemalum soluble.

In some embodiments, the cleaning composition comprises an acid. The cleaning composition may alter the pH of the hematoxylin waste solution, for example the cleaning composition may reduce the pH of the hematoxylin waste solution. In some embodiments, the cleaning composition (e.g., comprising an acid) alters the pH of the waste solution to a pH of about 3.0 (e.g., 2.8, 2.9, 3.0, 3.1, 3.2).

In some embodiments, the cleaning composition (e.g., comprising an acid) alters the pH of the waste solution to a pH from 2.0 to 3.0. In some embodiments, the cleaning composition (e.g., comprising an acid) alters the pH of the waste solution to a pH from 2.0 to 3.6. In some embodiments, the cleaning composition (e.g., comprising an acid) alters the pH of the waste solution to a pH from 2.0 to 3.5. In some embodiments, the cleaning composition (e.g., comprising an acid) alters the pH of the waste solution to a pH from 2.0 to 3.4. In some embodiments, the cleaning composition (e.g., comprising an acid) alters the pH of the waste solution to a pH from 2.0 to 3.3. In some embodiments, the cleaning composition (e.g., comprising an acid) alters the pH of the waste solution to a pH from 2.0 to 3.2. In some embodiments, the cleaning composition (e.g., comprising an acid) alters the pH of the waste solution to a pH from 2.0 to 3.1. In some embodiments, the cleaning composition (e.g., comprising an acid) alters the pH of the waste solution to a pH from 2.0 to 3.0. In some embodiments, the cleaning composition (e.g., comprising an acid) alters the pH of the waste solution to a pH from 2.0 to 2.9. In some embodiments, the cleaning composition (e.g., comprising an acid) alters the pH of the waste solution to a pH from 2.0 to 2.8. In some embodiments, the cleaning composition (e.g., comprising an acid) alters the pH of the waste solution to a pH from 2.0 to 2.7. In some embodiments, the cleaning composition (e.g., comprising an acid) alters the pH of the waste solution to a pH from 2.0 to 2.6. In some embodiments, the cleaning composition (e.g., comprising an acid) alters the pH of the waste solution to a pH from 2.0 to 2.5. In some embodiments, the cleaning composition (e.g., comprising an acid) alters the pH of the waste solution to a pH from 1.5 to 3.5, e.g., 1.5, 1.6, 1.7, 1.8, 1.9, 2.0, 2.1, 2.2, 2.3, 2.4, 2.5, 2.6, 2.7, 2.8, 2.9, 3.0, etc.

In some embodiments, the cleaning composition (e.g., comprising an acid) alters the pH of the waste solution to a pH from 2.5 to 3.3. In some embodiments, the cleaning composition (e.g., comprising an acid) alters the pH of the waste solution to a pH from 2.5 to 3.6. In some embodiments, the cleaning composition (e.g., comprising an acid) alters the pH of the waste solution to a pH from 2.5 to 3.5. In some embodiments, the cleaning composition (e.g., comprising an acid) alters the pH of the waste solution to a pH from 2.5 to 3.4. In some embodiments, the cleaning composition (e.g., comprising an acid) alters the pH of the waste solution to a pH from 2.5 to 3.3. In some embodiments, the cleaning composition (e.g., comprising an acid) alters the pH of the waste solution to a pH from 2.5 to 3.2. In some embodiments, the cleaning composition (e.g., comprising an acid) alters the pH of the waste solution to a pH from 2.5 to 3.1. In some embodiments, the cleaning composition (e.g., comprising an acid) alters the pH of the waste solution to a pH from 2.5 to 3.0. In some embodiments, the cleaning composition (e.g., comprising an acid) alters the pH of the waste solution to a pH from 2.5 to 2.9. In some embodiments, the cleaning composition (e.g., comprising an acid) alters the pH of the waste solution to a pH from 2.5 to 2.8. In some embodiments, the cleaning composition (e.g., comprising an acid) alters the pH of the waste solution to a pH from 2.5 to 2.7. In some embodiments, the cleaning composition (e.g., comprising an acid) alters the pH of the waste solution to a pH from 2.5 to 2.6.

In some embodiments, the cleaning composition (e.g., comprising an acid) alters the pH of the waste solution to a pH from 2.8 to 3.6. In some embodiments, the cleaning composition (e.g., comprising an acid) alters the pH of the waste solution to a pH from 2.8 to 3.5. In some embodiments, the cleaning composition (e.g., comprising an acid) alters the pH of the waste solution to a pH from 2.8 to 3.4. In some embodiments, the cleaning composition (e.g., comprising an acid) alters the pH of the waste solution to a pH from 2.8 to 3.3. In some embodiments, the cleaning composition (e.g., comprising an acid) alters the pH of the waste solution to a pH from 2.8 to 3.2. In some embodiments, the cleaning composition (e.g., comprising an acid) alters the pH of the waste solution to a pH from 2.8 to 3.1. In some embodiments, the cleaning composition (e.g., comprising an acid) alters the pH of the waste solution to a pH from 2.8 to 3.0. In some embodiments, the cleaning composition (e.g., comprising an acid) alters the pH of the waste solution to a pH from 2.8 to 2.9.

In some embodiments, the acid comprises hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, malic acid, the like, or a combination thereof. In some embodiments, the molarity of acid is from 0.04 M to 0.11 M. In some embodiments, the molarity of acid is from 0.04 to 1.1 M. For example, in some embodiments, the acid comprises 0.5 M sulfuric acid. In some embodiments, the acid comprises 1 M hydrochloric acid. In some embodiments, the acid comprises 0.08-0.11 M hydrochloric acid. In some embodiments, the acid comprises 0.08-0.11 M nitric acid. In some embodiments, the acid comprises 0.04-0.055 M sulfuric acid.

Examples 1 and 2 describe experiments with various acids at various concentrations. The present invention is not limited to the acids (or concentrations thereof) described herein. As an example, in some embodiments, the cleaning composition comprises hydrochloric acid, and the hydrochloric acid is added to the hematoxylin waste solution so as to lower the pH to 3.1. In some embodiments, the cleaning composition comprises sulfuric acid, and the hydrochloric acid is added to the hematoxylin waste solution so as to lower the pH to 2.9. In some embodiments, the cleaning composition comprises nitric acid, and the hydrochloric acid is added to the hematoxylin waste solution so as to lower the pH to 2.8. In some embodiments, the cleaning composition comprises phosphoric acid, and the hydrochloric acid is added to the hematoxylin waste solution so as to lower the pH to 3.0. In some embodiments, the cleaning composition comprises formic acid, and the hydrochloric acid is added to the hematoxylin waste solution so as to lower the pH to 2.9.

B. Oxidation

In some embodiments, the present invention features methods and compositions that utilize an oxidation process, e.g., methods and cleaning compositions that oxidize hemalum and/or hematein in the hematoxylin waste solution. Without wishing to limit the present invention to any theory or mechanism, it is believed that oxidizing hemalum and/or hematein is effective in removing and preventing the formation of precipitate in hematoxylin waste solution because these compounds may be broken down into new chemical species that may be unable to form the long chains of hemalum that may make up at least a portion of the hematoxylin precipitate.

In some embodiments, the cleaning composition comprises an oxidizing agent. In some embodiments, the cleaning composition comprises an oxidizing agent and a base. The cleaning composition may alter the pH of the hematoxylin waste solution, for example the cleaning composition may increase the pH of the hematoxylin waste solution. In some embodiments, the cleaning composition (e.g., comprising an base) alters the pH of the waste solution to a pH of 9.0 or above (e.g., 9.1 or above, 9.2 or above, 9.3 or above, 9.4 or above, 9.5 or above, 9.6 or above, 9.7 or above, etc.). In some embodiments, the cleaning composition (e.g., comprising a base) alters the pH of the waste solution to a pH of 10.0 or above (e.g., 10.1 or above, 10.2 or above, 10.3 or above, 10.4 or above, 10.5 or above, 10.6 or above, 10.7 or above, etc.). In some embodiments, the cleaning composition (e.g., comprising an base) alters the pH of the waste solution to a pH from 9.0 to 11.0.

In some embodiments, the cleaning composition (e.g., comprising an base) alters the pH of the waste solution to a pH from 9.5 to 11.0. In some embodiments, the cleaning composition (e.g., comprising an base) alters the pH of the waste solution to a pH from 9.5 to 10.5. In some embodiments, the cleaning composition (e.g., comprising an base) alters the pH of the waste solution to a pH from 9.2 to 11.0. In some embodiments, the cleaning composition (e.g., comprising an base) alters the pH of the waste solution to a pH from 9.6 to 10.8. In some embodiments, the cleaning composition (e.g., comprising an base) alters the pH of the waste solution to a pH from 9.5 to 10.3.

In some embodiments, the oxidizing agent comprises hydrogen peroxide, urea peroxide, sodium persulfate, potassium persulfate, ammonium persulfate, sodium perborate (e.g., if soluble), sodium percarbonate (e.g., if soluble), sodium chlorate, Minncare Sterilant (peracetate solution, Minntech Company), sodium hypochlorite, potassium bromate, the like, or a combination thereof. In some embodiments, the base comprises potassium hydroxide, ethanolamine, sodium carbonate, trisodium phosphate dodecahydrate, sodium hydroxide, sodium sesquicarbonate, lithium hydroxide, lithium carbonate, potassium carbonate, the like, or a combination thereof. For example, in some embodiments, the oxidizing agent comprises hydrogen peroxide, e.g., 1%, 2%, 3%, 4%, 5%, 6%, etc. In some embodiments, the base comprises KOH, e.g., 0.1 M KOH, between 0.08 and 0.12 M KOH, etc. In some embodiments, the base comprises sodium carbonate, e.g., between (or including) 0.5 mg/mL and 10 mg/mL. In some embodiments, the base comprises ethanolamine (e.g., 0.5% (v/v), 1%, 2%, 3%, etc.) In some embodiments, the cleaning composition comprises hydrogen peroxide and KOH. In some embodiments, the cleaning composition comprises hydrogen peroxide and sodium carbonate. In some embodiments, the cleaning composition comprises hydrogen peroxide and ethanolamine In some embodiments, the cleaning composition comprises hydrogen peroxide and trisodium phosphate dodecahydrate. In some embodiments, the cleaning composition comprises hydrogen peroxide and sodium glycine monohydrate. In some embodiments, the cleaning composition comprises hydrogen peroxide and sodium carbonate and trisodium phosphate dodecahydrate.

Examples 1 and 2 describe experiments with various oxidizing agents. The present invention is not limited to the oxidizing agents (or concentrations thereof) described herein. As an example, in some embodiments, the cleaning composition comprises 3% hydrogen peroxide and 5 mg/mL sodium carbonate. In some embodiments, the cleaning composition comprises 3% hydrogen peroxide and 20 mg/mL trisodium phosphate dodecahydrate.

C. Metal Complexation or Chelation

In some embodiments, the present invention features methods and compositions that utilize metal complexation or chelation, e.g., methods and cleaning compositions that complex or chelate metal, e.g., aluminum, in the hematoxylin waste solution. Without wishing to limit the present invention to any theory or mechanism, it is believed that precipitate found in hematoxylin solution may comprise a chain molecule of repeating units of hemalum, and the large size of the hemalum chain may render it insoluble (thus precipitating from solution). In some embodiments, the cleaning composition sequesters (e.g., chelates) aluminum. In some embodiments, the sequestration (e.g., chelation) of aluminum helps to break apart the long chain hemalum molecule into hematein molecules, wherein the hematein molecules are soluble.

In some embodiments, the cleaning composition comprises a chelating agent or a complexing agent (e.g., an aluminum chelator, an aluminum complexing agent, etc.). The chelating agent or complexing agent preferably has a complexation constant that exceeds the complexation constant between hematoxylin and aluminum. Additionally, the conditions of the hematoxylin solution may be adjusted such that the aluminum chelator or the aluminum complexing agent has greater affinity for aluminum than the affinity of hematoxylin for aluminum (e.g., by adjusting the pH, salt content, etc.). In the present methods, the aluminum complexing agent or aluminum chelating agent is introduced into the hematoxylin waste system or in the hematoxylin waste solution in an amount that results in an excess of complexing or chelating agent relative to the amount of aluminum in the heamtoxylin waste solution. In some embodiments, the cleaning composition causes the precipitate to dissolve. In some embodiments, the cleaning solution chelates or complexes aluminum.

In some embodiments, the aluminum complexing agent or aluminum chelating agent comprises ethylenediaminetetraacetic acid (EDTA), ethylene glycol tettraacetic acid (EGTA), diethylene triamine pentaacetic acid (DTPA), sodium fluoride, citrate, tartrate, sulfosalicylic acid, 8-hydroxy quinoline, iminodiacetic acid (IDA), trans-1,2-cyclohexanediaminetetraacetic acid (CDTA), ethylenediamine-N, N'-disuccinic acid (EDDS), phosphate, Tiron (also known as "4,5-Dihydroxy-1,3-benzenedisulfonic acid disodium salt" and "Pyrocatechol-3,5-disulfonic acid disodium salt"), the like, or a combination thereof.

In some embodiments, the cleaning composition comprises from 0.02 to 0.3 M citrate, e.g., 0.06 M to 0.20 M citrate. In some embodiments, the cleaning composition comprises from 0.02 to 0.3 M tartrate, e.g., 0.06 M to 0.20 M tartrate. In some embodiments, the cleaning composition comprises from 0.02 to 0.3 M EDTA, e.g., 0.06 M to 0.20 M EDTA. In some embodiments, the cleaning composition comprises from 0.02 to 0.3 M DTPA, e.g., 0.06 M to 0.20 M DTPA. In some embodiments, the cleaning composition comprises from 0.02 to 0.3 M sulfosalicylic acid, e.g., 0.06 M to 0.20 M sulfosalicylic acid. In some embodiments, the cleaning composition comprises from 0.02 to 0.3 M 8-hydroxyquinoline, e.g., 0.06 M to 0.20 M 8-hydroxyquinoline. In some embodiments, the cleaning composition comprises from 0.02 to 0.3 M IDA, e.g., 0.06 M to 0.20 M IDA. In some embodiments, the cleaning composition comprises from 0.02 to 0.3 M CTDA, e.g., 0.06 M to 0.20 M CTDA. In some embodiments, the cleaning composition comprises from 0.02 to 0.3 M phosphate, e.g., 0.06 M to 0.20 M phosphate.

In some embodiments, the cleaning composition comprises from 0.02 to 2 M citrate. In some embodiments, the cleaning composition comprises from 0.02 to 2 M tartrate. In some embodiments, the cleaning composition comprises from 0.02 to 2 M EDTA. In some embodiments, the cleaning composition comprises from 0.02 to 2 M DTPA. In some embodiments, the cleaning composition comprises from 0.02 to 2 M sulfosalicylic acid. In some embodiments, the cleaning composition comprises from 0.02 to 2 M 8-hydroxyquinoline. In some embodiments, the cleaning composition comprises from 0.02 to 2 M IDA. In some embodiments, the cleaning composition comprises from 0.02 to 2 M CTDA. In some embodiments, the cleaning composition comprises from 0.02 to 2 M phosphate.

In some embodiments, the cleaning composition comprises a 1 M Phosphoric acid solution. In some embodiments, the cleaning composition comprises a 0.8 M Phosphate buffer solution, pH=1.5). In some embodiments, the cleaning composition comprises a 0.5 M Phosphate buffer solution with 50% propylene glycol, pH=2.3. In some embodiments, the cleaning composition comprises a 0.01 M Hydrofluoric acid solution, pH=3. In some embodiments, the cleaning composition comprises a 0.5 M Sodium fluoride solution, pH=5. In some embodiments, the cleaning composition comprises a 0.1 M Sulfosalicylic acid solution. In some embodiments, the cleaning composition comprises a 0.2 M EDDS solution. In some embodiments, the cleaning composition comprises a 0.2 M citrate solution, pH 6.3. In some embodiments, the cleaning composition comprises a 0.2 M Tartrate solution. The present invention is not limited to the aforementioned components.

In some embodiments, the cleaning composition alters the pH of the waste solution to a pH from 5 to 8. In some embodiments, the cleaning composition alters the pH of the waste solution to a pH from 5.2 to 8.2. In some embodiments, the cleaning composition (alters the pH of the waste solution to a pH from 5.5 to 7.5. In some embodiments, the cleaning composition alters the pH of the waste solution to a pH from 5 to 9.

In some embodiments, the cleaning composition alters the pH of the waste solution to a pH from 6 to 8. In some embodiments, the cleaning composition alters the pH of the waste solution to a pH from 6.2 to 8.2. In some embodiments, the cleaning composition (alters the pH of the waste solution to a pH from 6.5 to 7.5. In some embodiments, the cleaning composition alters the pH of the waste solution to a pH from 6 to 9. In some embodiments, the cleaning composition alters the pH of the waste solution to a pH from 6 to 10.

In some embodiments, the cleaning composition alters the pH of the waste solution to a pH from 2 to 6. In some embodiments, the cleaning composition alters the pH of the waste solution to a pH from 3 to 6. In some embodiments, the cleaning composition (alters the pH of the waste solution to a pH from 4 to 6. In some embodiments, the cleaning composition alters the pH of the waste solution to a pH from 5 to 6.

In some embodiments, the cleaning composition alters the pH of the waste solution to a pH from 2.5 to 10. In some embodiments, the cleaning composition alters the pH of the waste solution to a pH from 3 to 10. In some embodiments, the cleaning composition (alters the pH of the waste solution to a pH from 4 to 10. In some embodiments, the cleaning composition alters the pH of the waste solution to a pH from 5 to 10.

In some embodiments, the cleaning composition alters the pH of the waste solution to a pH from 2 to 11. In some embodiments, the cleaning composition alters the pH of the waste solution to a pH from 3 to 9. In some embodiments, the cleaning composition alters the pH of the waste solution to a pH from 3 to 11. In some embodiments, the cleaning composition alters the pH of the waste solution to a pH from 5 to 11.

Without wishing to limit the present invention to any theory or mechanism, it is believed that a cleaning composition comprising citrate (e.g., 0.2 M Citrate solution, pH=6.1-6.3) may be advantageous because it has a near neutral pH, which is not considered corrosive and/or hazardous.

D. Metal-Salts

The present invention features methods and compositions that utilize metal salts. In some embodiments, the cleaning composition comprises a salt. In some embodiments, the salt comprises potassium aluminum sulfate, ferric chloride, sodium fluoride, the like, or a combination thereof. Without wishing to limit the present invention to any theory or mechanism, it is believed that cleaning compositions comprising a metal salt may provide a solution that is less corrosive and/or hazardous as compared to an acidic solution have a pH of about 1.5.

E. Reduction

The present invention also features methods and compositions that utilize reduction reactions. In some embodiments, the cleaning composition comprises a reducing agent. In some embodiments, the reducing agent comprises potassium bromate, sodium sulfite, sodium dithionite, sodium thiosulfate, sodium bisulfite, the like, or a combination thereof.

In some embodiments, the cleaning composition comprises a 0.05 to 0.2 M sodium bisulfite solution (e.g., a 0.1 M sodium bisulfite solution). In some embodiments, the cleaning composition comprises a 0.02 M to 0.2 M sodium dithionite solution (e.g., a 0.05 M sodium dithionite solution, a 0.1 M sodium dithinonite solution, etc.). In some embodiments, the cleaning composition comprises a 0.1 to 0.3 M potassium bromate solution (e.g., a 0.33 M potassium bromate solution). In some embodiments, the cleaning composition comprises a 1 mg/mL to 50 mg/ml sodium sulfite solution (e.g., 10 mg/mL).

III. EXAMPLES

Example 1

Example 1: Compositions and Methods for Addressing Precipitate in Hematoxylin Waste Described herein are non-limiting examples of compositions and methods for preventing the formation of precipitate or removing or cleaning precipitate in hematoxylin waste solution. These methods may be performed in an automated staining instrument; however, the methods are not limited to use in automated applications. The experiments herein describe the addition of various chemical additives (cleaning compositions) to a hematoxylin waste solution, and the examination of the amount of precipitate in the treated waste solution. The cleaning compositions help to reduce or prevent the precipitate in the hematoxylin waste solution, or the cleaning solutions can help to remove (or clean) the precipitate. For example, the cleaning compositions help to reduce or prevent the precipitate from forming and depositing a solid film on the surfaces it contacts. Or, the cleaning compositions help to dissolve (or remove or clean) the precipitate that is present in the waste solution. The cleaning compositions described herein work on the chemical principles of acidification, oxidation, or metal complexation (e.g., for preventing or reducing formation of precipitate), or the chemical principles of metal complexation or chelation or reduction (e.g., for removing or cleaning precipitate). Without wishing to limit the present invention to any theory or mechanism, it is believed that because precipitate formation is prevented (or significantly reduced), or cleaned or removed, it may not be necessary to clean the surfaces the waste solution contacts as often (or at all).

Hematoxylin Waste Solution:

Table 1 and Table 1A show an example of hematoxylin waste solution (the solutions are the same: Table 1 shows a detailed version of Table 1A). Note the multiple components of the hematoxylin waste solution shown in Table 1A, e.g., the wash solution, the nuclear stain (e.g., the hematoxylin stain), the eosin, the bluing solution, etc. The present invention is not limited to applications with hematoxylin waste solution of the particular composition in Table 1/Table 1A.

TABLE 1

| Hematoxylin Waste Solution | Hematoxylin Waste Solution |
|---|---|
| 360 | Water (mL/L) |
| 30600 | Ethylene Glycol (mg/L) |
| 240 | Aluminum (mg/L) |
| 980 | Hydroquinone (mg/L) |
| 116900 | C9-C16 alkanes (mg/L) |
| 94700 | Dipropylene glycol propyl ether (mg/L) |
| 255300 | Propylene glycol (mg/L) |
| 730 | TRIS (mg/L) |
| 420 | Acetic acid (mg/L) |
| 0.33 | Iodide (mM) |
| 1.1 | beta-Cyclodextrin (mM) |
| 1.1 | Hematoxylin (mM) |
| 1.1 | Hematein (mM) |
| 0.07 | Eosin (mM) | pH of waste = 3.8

TABLE 1A

| Hematoxylin Waste Solution | |
|---|---|
| Compound | v/v % |
| ATLAS Transfer Fluid | 10.6 |
| ATLAS Wash Solution | 40.7 |
| ATLAS Nuclear Stain | 8.1 |
| ATLAS Eosin | 7.9 |
| ATLAS Differentiating Solution | 7.3 |
| ATLAS Bluing Solution | 6.8 |
| ATLAS Organic Solution | 18.6 |

Overview of Method of Introducing a Cleaning Composition to the Hematoxylin Waste Solution:

An additional reagent reservoir, which holds the cleaning composition, was added to the automated slide staining machine (e.g., VENTANA HE 600 system). After a tray of slides was stained, the reagent delivery head was positioned over the waste tray and the cleaning composition was dispensed directly into the waste tray. Solution in the waste tray was evacuated into the waste reservoir. In this way, the cleaning composition was introduced into the waste reservoir. There, the cleaning solution can help to prevent the formation of precipitate or reduce the amount of precipitate. A small amount of cleaning composition was also introduced into the waste reservoir through the evacuation lines in the reagent delivery head. For example, after a reagent was dispensed from the reagent delivery head, the cavities in the reagent delivery head were evacuated in preparation for the introduction of the next reagent. (These evacuation lines lead to the waste reservoir.) So, after the dispensation of cleaning composition into the waste tray, the reagent delivery head was evacuated and the residual cleaning composition in the head was delivered to the waste reservoir.

Overview of Filtration Test:

This test was a modification of EPA Method 160.2—Non-filterable residue. A glass fiber filter was washed with water and dried in an oven held at 103° C.-105° C. for at least one hour. The filter was then cooled in a desiccator and weighed. The filter was placed at the bottom of a Buchner funnel crucible and a vacuum was applied. A small amount of water was added to the filter to allow it to seat tightly against the support surface. The sample to be analyzed was shaken vigorously and then a predetermined volume was transferred to the filter using a graduated cylinder. All traces of solution were then suctioned through the filter. The residue was washed with DI water, and suction was applied until all traces of solution were gone. Suction was stopped and the filter was carefully removed from the filter support. The filter was dried at 103° C.-105° C., cooled in a desiccator, and weighed.

Overview of Tubing Loop Experiment:

A 12 inch section of Perfluoroalkoxy polymer (PFA) tubing was filled with hematoxylin stain (e.g., ATLAS Nuclear Stain (ANS)). The tubing was joined at both ends with a coupler to form a loop. The tubing loop was placed in an oven held at 60° C. for about 14 days. During this time, the heat caused the hematoxylin stain to precipitate and coat the inside of the tubing loop. After the heated incubation period, the tubing loop was removed, drained, and rinsed with DI water. The loop was then left open and allowed to dry (leaving the tubing with a dark coating of hematoxylin stain precipitate coating the inside wall of the tubing). To test a cleaning composition of the present invention, a pre-precipitated tubing loop was filled with a cleaning composition, closed to form a loop, and allowed to sit for about 1 minute at room temperature. The solution was then drained and the tubing was rinsed with DI water. The tubing was then examined visually for evidence of precipitate removal.

Overview of Spotting Test Experiment:

A six month old, unopened bottle of VMSI N2+ solution was obtained. The N2+ solution was drained from the bottle and the bottle was rinsed three times with DI water. There was a noticeable precipitate residue on the inside of the bottle where the N2+ solution contacted the inside of the bottle. The bottle was cut open and the DI water residue was allowed to evaporate. Portions of the bottle that contained the precipitate residue were obtained and used in the spotting test. A portion of the cut away bottle was laid on the lab bench with the inner side of the bottle portion facing up. This inner side is the side of the bottle portion that is coated with precipitate residue. One drop of the cleaning composition was placed on the bottle portion and was allowed to remain for 15 seconds. After 15 seconds, the test cleaning solution was rinsed away with DI water and the spot was examined visually for evidence of precipitate removal.

Experiment 1 (Acidification):

100 mL of hematoxylin waste solution was made according to the waste formula given in Table 1 (pH=3.8). The hematoxylin waste solution was allowed to incubate at 40° C. overnight. The hematoxylin waste solution was filtered according to the above filtration test and the amount of precipitate was calculated. This experiment was repeated twice.

Another portion of hematoxylin waste solution was generated according to Table 1. The pH of the waste solution was adjusted with hydrochloric acid to 3.0 before overnight incubation at 40° C. The hematoxylin waste solution was filtered according to the above filtration test and the amount of precipitate was calculated. This experiment was repeated twice.

Another portion of hematoxylin waste solution was generated according to Table 1. The pH of the hematoxylin waste solution was adjusted with hydrochloric acid to 2.5 before overnight incubation at 40° C. The hematoxylin waste solution was filtered according to the above filtration test and the amount of precipitate was calculated. This experiment was repeated twice.

Another portion of hematoxylin waste solution was generated according to Table 1. The pH of the hematoxylin waste solution was adjusted with hydrochloric acid to 2.0 before overnight incubation at 40° C. The hematoxylin waste solution was filtered according to the above filtration test and the amount of precipitate was calculated. This experiment was repeated twice.

The results are summarized below in Table 2.

TABLE 2

Results from Experiment 1

| pH | Average Precipitate Level (mg/L) |
|---|---|
| 3.8 (unadjusted) | 300 |
| 3.0 | 10 |
| 2.5 | 2 |
| 2.0 | <1 |

Experiment 2 (Acidification):

A similar experiment (similar to Experiment 1) was repeated keeping the pH of the hematoxylin waste solution closer in check. The results are summarized below in Table 3.

TABLE 3

Results from Experiment 2

| pH | Average Precipitate Level (mg/L) |
|---|---|
| 3.8 (unadjusted) | 210 |
| 3.5 | 120 |
| 3.3 | 30 |
| 3.1 | 4 |
| 2.9 | <1 |

Experiment 3 (Acidification):

2035 mL of hematoxylin waste solution was formulated without ATLAS Organic Solution according to Table 1A. The pH of the formulation was recorded, pH=3.81. 135 mL of ATLAS Cleaning Solution (ACS Rev C 113) was added to the formulation and the resulting pH level was recorded, pH=3.04. Note: 6.6 mmole of acid ($H^+$) per 1 L of waste required.

Experiment 4 (Acidification):

101 mL of hematoxylin waste solution was formulated without ATLAS Organic Solution according to Table 1A. The pH of the formulation was recorded, pH=3.78. 0.8 mL of 0.5 M sulfuric acid was added to the formulation and the resulting pH level was recorded, pH=3.01. Note: 7.9 mmol of acid ($H^+$) per 1 L of waste required.

Experiment 5 (Acidification):

85.1 mL of hematoxylin waste solution was formulated without ATLAS Organic Solution according to Table 1A. The pH of the formulation was recorded, pH=3.81. 0.6 mL of 1 M hydrochloric acid (Fluka lot# SHBB 4705B) was added to the formulation and the resulting pH level was recorded, pH=2.97. Note: 7.1 mmol of acid ($H^+$) per 1 L of waste required.

Experiment 6 (Acidification):

85.1 mL of hematoxylin waste solution was formulated without ATLAS Organic Solution according to Table 1A. The pH of the formulation was recorded, pH=3.81. 0.5 mL of 1 M hydrochloric acid (Fluka lot# SHBB 4705B) was added to the formulation and the resulting pH level was recorded, pH=2.93. Note: 5.9 mmol of acid ($H^+$) per 1 L of waste required.

Conclusions of Experiments 3-6 (Acidification)

In order to drop the pH of hematoxylin waste solution, e.g., from a VENTANA HE 600 system, to a level where precipitation is prevented (e.g., pH≈3), a certain amount of acid may need to be added for a given volume of waste. In some embodiments, about 70 mL of acid solution is added for every 1 L of hematoxylin waste solution. Given this volume and the amount of acid required to bring the waste to a pH≈3 from experiments 3-6, acid (H$^+$) concentrations from 0.08 M to 0.11 M may be required. The following cleaning compositions (solutions) may be considered: (a) 0.08-0.11 M Hydrochloric acid; (b) 0.08-0.11 M Nitric acid; (c) 0.04-0.055 M Sulfuric acid. The present invention is not limited to the aforementioned examples of cleaning compositions (solutions).

Experiment 7 (Oxidation):

Two 100 mL samples of hematoxylin waste solution were made according to Table 1. To the first sample (test), 15 mL of 3% hydrogen peroxide solution adjusted with sodium carbonate to pH=10, was added. To the second solution (control), nothing additional was added. The waste solutions were allowed to incubate at room temperature overnight. The solutions were filtered according to the above filtration test and the amount of precipitate was calculated.

The results are summarized as follows: Control precipitate level (mg/L)=170; Test precipitate level (mg/L)=2.

Experiment 8 (Oxidation):

A spot test experiment was conducted comparing different 2-part peroxide solutions. The experimental set-up and results are shown in Table 4.

TABLE 4

Results from Experiment 8

| Solution | pH | Cleaning Results |
| --- | --- | --- |
| 100 mL of 3% hydrogen peroxide + 1 g of TRIS | 9.2 | Poor. Some cleaning observed |
| 100 mL of 3% hydrogen peroxide + 40 mL of 0.1M KOH | 9.8 | Decent/good |
| 100 mL of 3% hydrogen peroxide + 1 g of sodium carbonate | 9.85 | Decent/good |
| 100 mL of 3% hydrogen peroxide + 2 g of sodium carbonate | 9.9 | Good |
| 100 mL of 3% hydrogen peroxide + 3 g of sodium carbonate | 10 | Excellent |
| 100 mL of 3% hydrogen peroxide + 5 g of sodium carbonate | 10 | Excellent |

Experiment 9 (Oxidation):

A tubing loop experiment was conducted with alternate bases used to elevate the pH of a hydrogen peroxide solution. The experimental set-up and results are shown in Table 5.

TABLE 5

Results from Experiment 9

| Solution part 1 | Part 2 | pH | Results |
| --- | --- | --- | --- |
| 100 mL of 3% hydrogen peroxide solution | 1 mL ethanolamine | 10.0 | Precipitate removed from tubing wall. Precipitate solids left undissolved for hours. |
| 100 mL of 3% hydrogen peroxide solution | 2 g of trisodium phosphate dodecahydrate | 10.15 | Precipitate removed from tubing wall. Precipitate solids left undissolved for 3 to 5 minutes. |
| 100 mL of 3% hydrogen peroxide solution | 3 g of sodium glycine monohydrate | 10.19 | Precipitate removed from tubing wall. Precipitate solids left undissolved for 3 to 5 minutes. |
| 100 mL of 3% hydrogen peroxide solution | 2 g of sodium carbonate & 1 g of trisodium phosphate dodecahydrate | 10.16 | Precipitate removed from tubing wall. Precipitate solids left undissolved for about 1 minute. |

Conclusions of Experiments 8 and 9 (Oxidation)

Experiments 8 and 9 demonstrate that the hydrogen peroxide solution could be activated at pH levels in a range near 10 and could be activated by various base compounds.

Experiment 10 (Aluminum Complexation):

100 mL of hematoxylin waste solution was made according to Table 1. The hematoxylin waste solution was allowed to incubate at room temperature overnight. The hematoxylin waste solution was filtered according to the above filtration test and the amount of precipitate was calculated. This experiment was repeated twice (control).

Another portion of hematoxylin waste solution was generated according to Table 1. The hematoxylin waste solution was treated with disodium ethylenediaminetetraacetate (EDTA) before overnight incubation at room temperature. This waste solution mixture (Test 1) was filtered according to the above filtration test and the amount of precipitate was calculated. This experiment was repeated twice.

Another portion of hematoxylin waste solution was generated according to Table 1. The hematoxylin waste solution was treated with diethylene triamine pentaacetic acid (DTPA) before overnight incubation at room temperature. This waste solution mixture (Test 2) was filtered according to the above filtration test and the amount of precipitate was calculated. This experiment was repeated twice.

The results were: Control Average Precipitate Level=180 mg/L; Test 1 Average Precipitate Level=1 mg/L; Test 2 Average Precipitate Level=<1 mg/L.

Experiment 11 (Aluminum Complexation):

100 mL of hematoxylin waste was made according to the waste formula given in Table 1. The hematoxylin waste solution was allowed to incubate at room temperature overnight. The hematoxylin waste solution was filtered according to the above filtration test and the amount of precipitate was calculated. This experiment was repeated twice (control)

Another portion of hematoxylin waste solution was generated according to Table 1. The hematoxylin waste solution was treated with sodium fluoride (pH=4.4) before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with sulfosalicylic acid before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with neutralized tartaric acid (pH=3.57) before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with 8-hydroxy quinoline before overnight incubation at room temperature. The waste solution was filtered according to the above filtration test and the amount of precipitate was calculated. This experiment was repeated twice.

The results are summarized in Table 6 below.

TABLE 6

Results from Experiment 11

| Sample | Average Precipitate Level (mg/L) |
|---|---|
| Control | 170 |
| Sodium Fluoride | 45 |
| Sulfosalicylic acid | 7 |
| Tartrate | 2 |
| 8-OH quinolone | 3 |

Experiment 12 (Aluminum Complexation):

100 mL of hematoxylin waste was made according to Table 1. The hematoxylin waste solution was allowed to incubate at room temperature overnight. The hematoxylin waste solution was filtered according to the above filtration test and the amount of precipitate was calculated. This experiment was repeated twice (control).

Another portion of hematoxylin waste solution was generated according to Table 1. The hematoxylin waste solution was treated with neutralized tartaric acid (pH=3.57) before overnight incubation at room temperature. The waste solution was filtered according to the above filtration test and the amount of precipitate was calculated. This experiment was repeated twice.

The results were: Control Average Precipitate Level=200 mg/L; Tartrate Average Precipitate Level=2 mg/L.

Experiment 13 (Aluminum Complexation):

100 mL of hematoxylin waste solution was made according to Table 1. The hematoxylin waste solution was allowed to incubate at room temperature overnight. The hematoxylin waste solution was filtered according to the above filtration test and the amount of precipitate was calculated. This experiment was repeated twice (control).

Another portion of hematoxylin waste solution formula was generated according to Table 1. The hematoxylin waste solution was treated with citrate solution (pH=4.85) before overnight incubation at room temperature. The waste solution was filtered according to the above filtration test and the amount of precipitate was calculated. This experiment was repeated twice.

The results were: Control Average Precipitate Level=170 mg/L; Citrate Average Precipitate Level=<1 mg/L.

Experiment 14 (Aluminum Complexation):

100 mL of hematoxylin waste solution was made according to Table 1. The hematoxylin waste solution was allowed to incubate at room temperature overnight. The hematoxylin waste solution was filtered according to the above filtration test and the amount of precipitate was calculated. This experiment was repeated twice (control).

Another portion of hematoxylin waste solution formula was generated according to Table 1. The hematoxylin waste solution was treated with EDTA before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with DTPA before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with iminodiacetic acid (IDA) before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with trans-1,2-cyclohexanediaminetetraacetic acid (CDTA) before overnight incubation at room temperature. The waste solution was filtered according to the above filtration test and the amount of precipitate was calculated. This experiment was repeated twice.

The results of Experiment 14 are summarized in Table 7 below.

TABLE 7

Results from Experiment 14

| Sample | Average Precipitate Level (mg/L) |
|---|---|
| Control | 170 |
| EDTA | 1 |
| DTPA | <1 |
| IDA | 8 |
| CDTA | 4 |

Experiment 15 (Aluminum Complexation):

100 mL of hematoxylin waste solution was made according to Table 1. The hematoxylin waste solution was allowed to incubate at room temperature overnight. The hematoxylin waste solution was filtered according to the above filtration test and the amount of precipitate was calculated. This experiment was repeated twice (control).

Another portion of hematoxylin waste solution was generated according to Table 1. The hematoxylin waste solution was treated with EDTA before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with citrate solution before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with tartrate solution before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with ethylenediamine-N,N'-disuccinic acid (EDDS) before overnight incubation at room temperature. The waste solution was filtered according to the above filtration test and the amount of precipitate was calculated. This experiment was repeated twice.

The results of Experiment 15 are shown in Table 8 below.

TABLE 8

Results from Experiment 15

| Sample | Average Precipitate Level (mg/L) |
|---|---|
| Control | 130 |
| EDTA | <1 |
| Citrate | <1 |
| Tartrate | <1 |
| EDDS | 110 |

Experiment 16 (Aluminum Complexation):

100 mL of hematoxylin waste solution was made according to Table 1. The hematoxylin waste solution was allowed to incubate at room temperature overnight. The hematoxylin waste solution was filtered according to the above filtration test and the amount of precipitate was calculated. This experiment was repeated twice (control).

Another portion of hematoxylin waste solution was generated according to Table 1. The hematoxylin waste solution was treated with citrate solution before overnight incubation at room temperature. The waste solution was filtered according to the above filtration test and the amount of precipitate was calculated. This experiment was repeated twice.

Another portion of hematoxylin waste solution was generated according to Table 1. The hematoxylin waste solution was treated with tartrate solution before overnight incubation at room temperature. The waste solution was filtered according to the above filtration test and the amount of precipitate was calculated. This experiment was repeated twice.

The results are summarized in Table 9 below.

TABLE 9

Results from Experiment 16

| Sample | Average Precipitate Level (mg/L) |
|---|---|
| Control | 130 |
| Citrate | <1 |
| Tartrate | <1 |

Experiment 17 (Aluminum Complexation):

Several 180 mL portions of hematoxylin waste solution were formulated without ATLAS Organic Solution according to Table 1A. The hematoxylin waste solutions were treated with 10 mL of various concentrations of citrate solution before overnight incubation at room temperature. The waste solutions were filtered according to the above filtration test and the amount of precipitate from each sample was measured. The details are summarized in Table 10 below.

TABLE 10

Results from Experiment 17

| | Citrate Concentration (M) | Precipitate Amount (mg) | % of Control |
|---|---|---|---|
| Control | 0.00 | 36 | 100 |
| 1 | 0.20 | <1 | <3 |
| 2 | 0.18 | <1 | <3 |

TABLE 10-continued

Results from Experiment 17

| | Citrate Concentration (M) | Precipitate Amount (mg) | % of Control |
|---|---|---|---|
| 3 | 0.16 | <1 | <3 |
| 4 | 0.14 | <1 | <3 |
| 5 | 0.12 | <1 | <3 |
| 6 | 0.10 | <1 | <3 |
| 7 | 0.06 | <1 | <3 |
| 8 | 0.04 | 4 | 11 |
| 9 | 0.02 | 10 | 28 |
| 10 | 0.01 | 24 | 67 |

Hematoxylin stain (e.g., ATLAS Nuclear Stain) may contain about 80 mM aluminum ion ($Al^{3+}$); if so, the hematoxylin waste solution may contain about 7.6 mM $Al^{3+}$. From this, 180 mL of waste solution contains 1.4 mmoles of $Al^{3+}$. In order to chelate all of the $Al^{3+}$ with citrate, assuming a 1:1, citrate to $Al^{3+}$ reaction, a concentration of 0.14 M citrate may be required from a 10 mL addition. From the results, a 0.06 M citrate solution was sufficient to reduce precipitation to a negligible level. So, by chelating only about half of the $Al^{3+}$ in the solution, precipitation appeared to be controlled.

Conclusions of Experiments 10-17 (Aluminum Complexation)

In order to chelate enough $Al^{3+}$ in hematoxylin waste solution, e.g., hematoxylin waste solution from a VENTANA HE 600 system, to prevent precipitation, a certain amount of chelating or complexing agent may need to be added for a given volume of waste. In some embodiments, about 50 mL of chelating solution is added for every 1 L of waste. Given this volume and the amount of chelant required to complex about half of the $Al^{3+}$ present, chelant concentrations from 0.06 M to 0.20 M may be required. In some embodiments, the following compounds at a concentration of 0.06 M to 0.20 M may be used for a cleaning composition: citrate, tartrate, EDTA, DTPA, sulfosalicylic acid, 8-hydroxyquinoline, IDA, CDTA, and phosphate. The present invention is not limited to the aforementioned chemical examples.

Experiment 18 (Aluminum Complexation):

A spot test experiment comparing 0.125M $FeCl_3$ solution (Fe-ACS), 1M phosphoric acid solution, 0.8 M phosphate buffer (pH=1.5), and 1M phosphate buffer (pH=2.3) was conducted. It appeared that Fe-ACS and the 1M phosphoric acid solution showed the most precipitate removal followed by the phosphate buffer solutions.

Experiment 19 (Aluminum Complexation):

A spot test experiment comparing Fe-ACS, 1M phosphate buffer (pH=2.3), 0.8 M phosphate buffer with 20% propylene glycol (pH=2.3), and 0.5 M phosphate buffer with 50% propylene glycol (pH=2.3) was conducted. It appeared that there was an improvement in cleaning ability as the propylene glycol concentration was increased. The 0.5M phosphate buffer with 50% propylene glycol (pH=2.3) appeared to compare very well to Fe-ACS in removing precipitate.

Experiment 20 (Aluminum Complexation):

A spot test experiment was performed on a 1:100 dilution of Rust Stain Remover (Whink Products Company, lot #313520706). There was visual evidence of moderate cleaning observed).

Experiment 21 (Aluminum Complexation):

A spot test experiment comparing 0.5 M NaF in 1M acetate buffer (pH=5), 0.1 M $NaH_2PO_4$, and 0.1M tartrate buffer (pH=4.7) appeared to show no evidence of cleaning with the phosphate and tartrate solutions and appeared to show good cleaning with the fluoride solution.

Experiment 22 (Aluminum Complexation):

A spot test experiment (60 second dwell time) comparing 0.1 M sulfosalicylic acid, 0.1 M citric acid, 0.1 M tartaric acid, and 0.1 M ascorbic acid appeared to show no evidence of cleaning with the citric, tartaric, or ascorbic acids and appeared to show slight cleaning with sulfosalicylic acid.

Experiment 23 (Aluminum Complexation):

A loop test experiment comparing 0.2 M ethylenediamine-N,N'-disuccinic acid (EDDS) solution in 50% propylene glycol, 0.2 M citrate in 50% propylene glycol, 0.27 M tartrate in 50% propylene glycol, and ATLAS Cleaning Solution (ACS) was conducted. All solutions appeared to show visual evidence of cleaning. It appeared that the order of best cleaning ability to worst cleaning ability was as follows: ACS, citrate, tartrate, and EDDS.

Experiment 24 (Aluminum Complexation):

A loop test with a 1 hour cleaning incubation at room temperature comparing ACS (0.1 M HCl in 50% propylene glycol) and ATLAS Citrate Cleaner (ACC—0.2M citrate buffer (pH=6.2) in 50% propylene glycol) was conducted. It appeared that ACC showed slightly better cleaning ability than ACS.

Example 2

Example 2: Compositions and Methods for Addressing Precipitate in Hematoxylin Waste Described herein are non-limiting examples of compositions and methods for preventing the formation of precipitate or removing or cleaning precipitate in hematoxylin waste solution. These methods may be performed in an automated staining instrument; however, the methods are not limited to use in automated applications. The experiments herein describe the addition of various chemical additives (cleaning compositions) to a hematoxylin waste solution, and the examination of the amount of precipitate in the treated waste solution. The cleaning compositions help to reduce or prevent the precipitate in the hematoxylin waste solution, or the cleaning solutions can help to remove (or clean) the precipitate. For example, the cleaning compositions help to reduce or prevent the precipitate from forming and depositing a solid film on the surfaces it contacts. Or, the cleaning compositions help to dissolve (or remove or clean) the precipitate that is present in the waste solution. The cleaning compositions described herein work on the chemical principles of acidification, oxidation, or metal complexation (e.g., for preventing or reducing formation of precipitate), or the chemical principles of metal complexation or chelation or reduction (e.g., for removing or cleaning precipitate). Without wishing to limit the present invention to any theory or mechanism, it is believed that because precipitate formation is prevented (or significantly reduced), or cleaned or removed, it may not be necessary to clean the surfaces the hematoxylin waste solution contacts as often (or at all).

Tables 11-14 below show Hematoxylin Waste Solutions (Formula #1, Formula #2, Formula #3, Formula #4).

TABLE 11

Formula #1
Hematoxylin Waste Solution Formula #1

| Compound | Volume (mL) |
| --- | --- |
| ATLAS Transfer Fluid | 140 |
| ATLAS Wash Solution | 375 |
| ATLAS Nuclear Stain | 115 |
| ATLAS Eosin | 72 |
| ATLAS Differentiating Solution | 64 |
| ATLAS Bluing Solution | 61 |
| ATLAS Organic Solution | 178 |

TABLE 12

Formula #2
Hematoxylin Waste Solution Formula #2

| Compound | Volume (mL) |
| --- | --- |
| Ethanol | 70 |
| Water | 185 |
| ATLAS Nuclear Stain | 60 |
| ATLAS Eosin | 35 |
| 1% Acid Alcohol Solution (Leica) | 30 |
| 5% Ammonia Solution | 30 |

TABLE 13

Formula #3
Hematoxylin Waste Solution Formula #3

| Compound | Volume (mL) |
| --- | --- |
| Ethanol | 70 |
| Water | 185 |
| Gill II Hematoxylin solution (Leica) | 60 |
| ATLAS Eosin | 35 |
| 1% Acid Alcohol Solution (Leica) | 30 |
| 5% Ammonia Solution | 30 |

TABLE 14

Formula #4
Hematoxylin Waste Solution Formula #4

| Compound | Volume (mL) |
| --- | --- |
| Ethanol | 70 |
| Water | 185 |
| Gill III Hematoxylin solution (Leica) | 60 |
| ATLAS Eosin | 35 |
| 1% Acid Alcohol Solution (Leica) | 30 |
| 5% Ammonia Solution | 30 |

Experiment 1 (Acidification):

About 1 L of hematoxylin waste solution was made according to Formula #1 in Table 11 (pH=3.7). The hematoxylin waste solution was divided into ten 100 mL portions. Each 100 mL portion of hematoxylin waste solution was treated with a specific acid to drop the pH of the solution below pH=3.1. The waste solutions were allowed to sit for 7 days at room temperature. The waste solutions were filtered according to the filtration test described in Example 1, and the precipitate level was measured. The results are summarized in Table 15 below. All of the acids in Table 15 reduced the amount of precipitate in the hematoxylin waste solution (Formula #1).

TABLE 15

Results of Experiment 1

| Acid | pH | Precipitate Level (mg/L) |
| --- | --- | --- |
| Control (no additive) | 3.7 | 269 |
| Hydrochloric acid | 3.0 | 7 |
| Sulfuric acid | 3.0 | 1 |
| Nitric acid | 2.9 | 1 |
| Formic acid | 3.0 | 2 |
| Fumaric acid | 3.0 | 0 |
| Malonic acid | 2.2 | 0 |
| Phosphoric acid | 2.2 | 3 |
| Oxalic acid | 2.2 | 0 |
| Acetic acid | 3.0 | 0 |

Experiment 2 (Oxidation):

About 1 L of hematoxylin waste solution was made according to the Formula #1 in Table 11 (pH=3.7). The hematoxylin waste solution was divided into 100 mL portions. Each 100 mL portion of hematoxylin waste solution was treated with a specific oxidizing compound. The solutions were allowed to sit for 1 day at room temperature. The solutions were filtered according to the filtration test (see Example 1) and the precipitate level was measured. The results are shown in Table 16 below.

TABLE 16

Results of Experiment 2

| Additive | Precipitate Level (mg/L) |
| --- | --- |
| Control (no additive) | 244 |
| 15 mL of 3% Hydrogen peroxide at pH ~10 | 9 |
| 15 mL of 0.25M sodium persulfate in 0.5M sodium carbonate solution | 851 |
| 15 mL of commercial chlorine bleach solution (~8% sodium hypochlorite) | 563 (over-oxidized) |
| 15 mL of Minncare Sterilant (Peracetate solution, Minntech Company) | 1021 (over-oxidized) |
| 1 g of urea peroxide | 255 |
| 1 g of sodium percarbonate | 505 |
| 1 g of sodium perborate | 995 |
| 1 g of sodium chlorate | 105 |
| 1 g of potassium bromate | 587 |

Of the oxidants tested, only the 3% hydrogen peroxide (pH~10) and sodium chlorate were effective in reducing the level of precipitate in the waste solutions (Formula 1). It appeared that chlorine bleach solution and the Minncare Sterilant solution over-oxidized the waste solution to where a different, insoluble precipitate compound was formed. (Note: later experiments were conducted with dilutions of these solutions, e.g., see Experiment 3 below.) (Note: sodium percarbonate, sodium perborate, sodium chlorate, and potassium bromate did not all fully dissolve in their respective waste solutions.)

Experiment 3 (Oxidation and Reduction):

About 1 L of hematoxylin waste solution was made according Formula #1 in Table 11. The waste solution was divided into 100 mL portions. Each 100 mL portion of waste was treated with a specific oxidizing or reducing compound. The waste solutions were allowed to sit for 3 days at room temperature. The waste solutions were filtered according to the filtration test (see Example 1) and the precipitate level was measured. The results are summarized in Table 17 below.

TABLE 17

Results of Experiment 3

| Additive | Precipitate Level (mg/L) |
| --- | --- |
| Control (no additive) | 263 |
| 15 mL of 10% dilution of a commercial chlorine bleach solution | 24 |
| 15 mL of a 10% dilution of Minncare Sterilant solution | 0 |
| 15 mL of a 1M sodium chlorate solution | 27 |
| 15 mL of a 1M sodium chlorite solution | 0 |
| 15 mL of a 0.33M potassium bromate solution | 138 |
| 15 mL of a 1M sodium persulfate solution | 1003 (over-oxidized) |
| 15 mL of a 1M urea peroxide/0.5M sodium carbonate solution | 569 (over-oxidized) |
| 1 g (pre-dissolved) of sodium sulfite | 171 |
| 0.1 g (pre-dissolved) of sodium sulfite | 303 |

Commercial chlorine bleach solution, Minncare Sterilant, sodium chlorate, and sodium chlorite appeared to be effective in oxidizing the hematein and preventing the formation of hematoxylin precipitate. Potassium bromate and sodium sulfite (1 g) were somewhat effective in reducing the level of hematoxylin precipitate. Sodium persulfate and urea peroxide both appeared to show evidence of oxidizing the hematoxylin (solution color change); however, it is possible that they over-oxidized the waste solution to where a different, insoluble precipitate compound was formed.

Experiment 4 (Chelation and Reduction):

About 1 L of hematoxylin waste solution was made according to Formula #1 in Table 11. The waste solution was divided into 100 mL portions. Each 100 mL portion of waste was treated with a specific chelating or reducing compound. The waste solutions were allowed to sit for 1 day at room temperature. The waste solutions were filtered according to the filtration test (see Example 1) and the precipitate level was measured. The results are summarized in Table 18 below.

TABLE 18

Results of Experiment 4

| Additive | Precipitate Level (mg/L) |
| --- | --- |
| Control (no additive) | 268 |
| 10 mL of 0.05M trisodium citrate solution | 0 |
| 10 mL of 0.05M ammonium oxalate solution | 216 |
| 10 mL of 0.05M sodium nitrilotriacetate (NTA) solution | 301 |
| 10 mL of 0.05M disodium hydrogen phosphate solution | 924 |
| 10 mL of 0.05M Tiron solution | 9 |
| 10 mL of 0.05M sodium ascorbate solution | 287 |
| 10 mL of 0.05M sodium dithionite solution | 0 |
| 10 mL of 0.05M sodium thiosulfate solution | 123 |
| 10 mL of 0.2% titanium (III) chloride solution | 581 (over-reduced) |

Of the chelating or complexing agents employed, citrate and Tiron appeared to be effective in minimizing the amount of precipitate in the waste solution. Oxalate showed some effect in reducing precipitate levels, while NTA showed no effect. It could be that the concentration of these compounds was too low to be effective. Disodium hydrogen phosphate may have raised the pH of the solution, which may have lead to an increase in precipitate levels. Of the reducing agents employed, dithionite appeared to be effective in preventing the formation of precipitate and thiosulfate was somewhat effective in reducing the amount of precipitate. Ascorbate seemed to have no effect. Titanium (III) ion reduced the waste formulation (solution color change), but it may have gone too far and may have produced reduced species that were no longer soluble in the solution.

Experiment 5:

About 400 mL of hematoxylin waste was made according to the Formula #2 in Table 12. The waste solution was divided into 100 mL portions. Each 100 mL portion of waste was treated with a specific compound. The waste solutions were allowed to sit for 1 day at room temperature. The waste solutions were filtered according to the filtration test (see Example 1) and the precipitate level was measured. The results are summarized in Table 19 below. All of the additives appeared to prevent or reduce the amount of precipitate in the waste solution (Formula 2).

TABLE 19

Results from Experiment 5

| Additive | Precipitate Level (mg/L) |
| --- | --- |
| Control (no additive) | 1655 |
| Hydrochloric acid to pH = 2.9 | 0 |
| 15 mL of 3% Hydrogen peroxide at pH ~10 | 1 |
| 10 mL of 0.07M trisodium citrate solution | 0 |

Experiment 6:

About 400 mL of hematoxylin waste was made according to the Formula #3 in Table 13. The waste solution was divided into 100 mL portions. Each 100 mL portion of waste was treated with a specific compound. The waste solutions were allowed to sit for 1 day at room temperature. The waste solutions were filtered according to the filtration test (see Example 1) and the precipitate level was measured. The results are summarized in Table 20 below.

TABLE 20

Results from Experiment 6

| Additive | Precipitate Level (mg/L) |
| --- | --- |
| Control (no additive) | 1312 |
| Hydrochloric acid to pH = 3.0 | 7 |
| 15 mL of 3% Hydrogen peroxide at pH ~10 | 1423 |
| 10 mL of 0.07M trisodium citrate solution | 664 |

Acidifying the waste solution appeared to be effective in preventing the formation of hematoxylin precipitate. Citrate appeared to be effective in reducing the amount of precipitate but the citrate concentration may have been too low (see Experiment 8 below). Hydrogen peroxide was not effective in controlling precipitate levels in this waste.

Experiment 7:

About 400 mL of hematoxylin waste was made according to the Formula #4 given in Table 14. The waste solution was divided into 100 mL portions. Each 100 mL portion of waste was treated with a specific compound. The waste solutions were allowed to sit for 1 day at room temperature. The waste solutions were filtered according to the filtration test (see Example 1) and the precipitate level was measured. The results are summarized in Table 21 below.

TABLE 21

Results from Experiment 7

| Additive | Precipitate Level (mg/L) |
| --- | --- |
| Control (no additive) | 1212 |
| Hydrochloric acid to pH = 2.9 | 6 |
| 15 mL of 3% Hydrogen peroxide at pH ~10 | 2200 |
| 10 mL of 0.07M trisodium citrate solution | 585 |

Acidifying the waste solution appeared to be effective in preventing the formation of hematoxylin precipitate. Citrate appeared to be effective in reducing the amount of precipitate but the citrate concentration may have been too low (see experiment #8). Hydrogen peroxide was not effective in controlling precipitate levels in this waste.

Experiment 8 (Chelating Agent):

About 400 mL of hematoxylin waste was made according to Formula #4 in Table 14. The waste solution was divided into 100 mL portions. Each 100 mL portion of waste was treated with different volumes of a 0.2M citrate solution. The waste solutions were allowed to sit for 1 day at room temperature. The waste solutions were filtered according to the filtration test (see Example 1) and the precipitate level was measured. The results are summarized in Table 22 below.

TABLE 22

Results from Experiment 8

| Additive | Precipitate Level (mg/L) |
| --- | --- |
| Control (no additive) | 1339 |
| 10 mL of 0.2M citrate solution | 10 |
| 15 mL of 0.2M citrate solution | 0 |
| 20 mL of 0.2M citrate solution | 0 |

All levels of 0.2M citrate solution tested were effective in preventing or reducing the formation of hematoxylin precipitate in the waste solution.

Experiment 9 (Oxidation):

About 400 mL of hematoxylin waste was made according to Formula #3 in Table 13. The waste solution was divided into 100 mL portions. Each 100 mL portion of waste was treated with different oxidizing compounds. The waste solutions were allowed to sit for 1 day at room temperature. The waste solutions were filtered according to the filtration test (see Example 1) and the precipitate level was measured. The results are summarized in Table 23 below.

TABLE 23

Results from Experiment 9

| Additive | Precipitate Level (mg/L) |
| --- | --- |
| Control (no additive) | 1312 |
| 15 mL of 1M sodium chlorite solution | 1133 (over-oxidized) |
| 15 mL of 1M sodium chlorate solution | 1028 |
| 15 mL of 10% dilution of a commercial chlorine bleach solution | 996 |
| 15 mL of a 10% dilution of Minncare Sterilant solution | 174 |

The Minncare Sterilant solution appeared to be effective in reducing the amount of hematoxylin precipitate in the waste solution. The sodium chlorite solution and the commercial chlorine bleach solution appeared to oxidize the waste solutions (color change of solution). The sodium chlorite solution may have over-oxidized the waste as the resulting waste solution lost almost all color. The levels of sodium chlorate and commercial bleach solution may not have been high enough to be effective in reducing the precipitate levels.

Experiment 10 (Complexing and Reduction):

About 400 mL of hematoxylin waste was made according Formula #4 in Table 14. The waste solution was divided into 100 mL portions. Each 100 mL portion of waste was treated with different complexing or reducing compounds. The waste solutions were allowed to sit for 1 day at room temperature. The waste solutions were filtered according to the filtration test (see Example 1) and the precipitate level was measured. The results are summarized in Table 24 below.

TABLE 24

Results from Experiment 10

| Additive | Precipitate Level (mg/L) |
|---|---|
| Control (no additive) | 1212 |
| 10 mL of 0.1M sodium dithionite solution | 685 |
| 10 mL of 0.1M sodium bisulfite solution | 844 |
| 10 mL of 0.2M sodium tartrate solution | 537 |
| 10 mL of 0.2M sodium dihydrogen phosphate solution | 2764 |

Of the reducing agents, dithionite and bisulfite both appeared somewhat effective in decreasing the hematoxylin precipitate levels in the waste solution. It may be that their concentrations were too low to be more effective. Of the complexing agents tested, sodium tartrate was effective in decreasing the hematoxylin precipitate levels in the waste solution. Again, a higher concentration of tartrate may have been more effective. Phosphate was not at all effective in decreasing the hematoxylin precipitate.

Conclusions Re: Experiments 1-10

The use of acids to drop the pH of a waste solution to around pH=3 appeared to be the most effective method in preventing the formation or decreasing the levels of hematoxylin precipitate. This was seen in all four hematoxylin waste solutions tested and with all of the acids tested.

Complexing agents were also effective but their levels at which they were effective seemed to change depending on the specific formulation of the hematoxylin waste. This may have been due to the differences in aluminum concentration between the different waste solutions tested as the complexing agents work by binding or complexing aluminum making it unavailable to form hemalum and eventually hematoxylin precipitate.

Oxidizing and reducing agents were also effective, but were trickier to find the correct levels for effectiveness as over or under oxidized or reduced waste could still lead to the formation of precipitate.

Example 3

Example 3: Examples of Cleaning Compositions

In addition to the cleaning compositions described above, Example 3 lists cleaning compositions that may be used according to the present invention. The present invention is not limited to the cleaning compositions described in Example 3.

0.1 M Hydrochloric acid
3% hydrogen peroxide solution with 30 g/L sodium carbonate
0.2 M citrate solution
0.27 M tartrate solution
EDTA solution
DTPA solution
Sodium fluoride solution, pH=4.4
Sulfosalicylic acid solution pH=2.3
8-hydroxyquinoline solution pH=4.2
EDDS solution, pH=4.2
IDA solution, pH=5.3
CDTA solution, pH=4.9
0.08-0.11 M Hydrochloric acid
0.08-0.11 M Nitric acid
0.04-0.055 M Sulfuric acid
0.06 M to 0.20 M Citrate
0.06 M to 0.20 M tartrate
0.06 M to 0.20 M EDTA
0.06 M to 0.20 M DTPA
0.06 M to 0.20 M sulfosalicylic acid
0.06 M to 0.20 M 8-hydroxyquinoline
0.06 M to 0.20 M IDA
0.06 M to 0.20 M CDTA
0.06 M to 0.20 M phosphate Additional Embodiments The following additional embodiments of the invention are also disclosed:

1. A method of reducing precipitate in a hematoxylin waste solution, said method comprising introducing a cleaning composition to the hematoxylin waste solution, said cleaning composition comprising an acid, wherein when combined the hematoxylin waste solution and cleaning composition have a pH from 2.0 to 3.5.

2. The method of embodiment 1, wherein the acid comprises hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, malic acid, or a combination thereof.

3. The method of embodiment 1, wherein the method causes the precipitate in the hematoxylin waste solution to dissolve.

4. The method of embodiment 1, wherein the pH of the combined hematoxylin waste solution and cleaning composition is from 2.0 to 3.3.

5. The method of embodiment 1, wherein the pH of the combined hematoxylin waste solution and cleaning composition is from 2.0 to 3.1.

6. The method of embodiment 1, wherein the method is performed in an automated slide stainer.

7. The method of embodiment 1, wherein the cleaning composition is added continuously to the hematoxylin waste solution.

8. The method of embodiment 6, wherein the automated slide stainer comprises a waste tray as a reservoir for the hematoxylin waste solution, wherein the cleaning composition is dispensed into the waste tray.

9. The method of embodiment 8, wherein the cleaning composition is added to the waste tray via a dispenser.

10. An automated method for reducing precipitate in a hematoxylin waste solution, said method comprising introducing a cleaning composition to the hematoxylin waste solution, said cleaning composition comprising an acid selected from the group consisting of hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, and malic acid; wherein when combined the hematoxylin waste solution and cleaning composition have a pH from 2.0 to 3.5, wherein said method is performed in an automated slide stainer.

11. A cleaning composition for reducing precipitate in hematoxylin waste solution, said composition comprising an acid selected from the group consisting of hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, and malic acid.

12. The cleaning composition of embodiment 11, wherein the cleaning composition is adapted to adjust the pH of the hematoxylin waste solution to a pH from 2.0 to 3.5.

13. The cleaning composition of embodiment 11, wherein the cleaning composition is adapted to adjust the pH of the hematoxylin waste solution to a pH from 2.5 to 3.1.

14. The cleaning composition of embodiment 11, wherein the cleaning composition causes the precipitate to dissolve.

15. An automated slide stainer capable of performing a method according to any of embodiments 1-10.

16. An automated slide stainer comprising a processor and a memory coupled to the processor, the memory stores computer-readable instructions that, when executed by the processor, cause the processor to perform operations comprising instructing the slide stainer to incubate introduce a cleaning composition to a hematoxylin waste solution, said cleaning composition comprising an acid, wherein when combined the hematoxylin waste solution and cleaning composition have a pH from 2.0 to 3.5.

17. The automated slide stainer of embodiment 16, wherein the acid comprises hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, malic acid, or a combination thereof.

18. The automated slide stainer of embodiment 16, wherein the cleaning composition causes the precipitate in the hematoxylin waste solution to dissolve.

19. The automated slide stainer of embodiment 16, wherein the pH of the combined hematoxylin waste solution and cleaning composition is from 2.0 to 3.3.

20. The automated slide stainer of embodiment 16, wherein the pH of the combined hematoxylin waste solution and cleaning composition is from 2.0 to 3.1.

21. The automated slide stainer of embodiment 16, wherein the cleaning composition is added continuously to the hematoxylin waste solution.

22. The automated slide stainer of embodiment 16, wherein the automated slide stainer comprises a waste tray as a reservoir for the hematoxylin waste solution, wherein the cleaning composition is dispensed into the waste tray.

23. The automated slide stainer of embodiment 22, wherein the cleaning composition is added to the waste tray via a dispenser.

24. A system comprising:
a. a waste tray for hematoxylin waste solution;
b. a cleaning composition reservoir adapted to dispense a cleaning solution into the waste tray; and
c. a control module adapted to instruct (b) to perform a method according to any of embodiments 1-10.

25. The system of embodiment 24, wherein the system comprises an automated slide stainer according to any of embodiments 15-23.

26. A method of reducing precipitate in a hematoxylin waste solution, said method comprising introducing a cleaning composition to the hematoxylin waste solution, said cleaning composition comprising an oxidizing agent and optionally a base, wherein when combined the hematoxylin waste solution and cleaning composition have a pH of 9.0 or above and precipitate in the hematoxylin waste solution dissolves.

27. The method of embodiment 26, wherein the oxidizing agent comprises hydrogen peroxide, urea peroxide, sodium persulfate, potassium persulfate, ammonium persulfate, sodium perborate, sodium percarbonate, sodium chlorate, peracetate solution, sodium hypochlorite, potassium bromate, or a combination thereof.

28. The method of embodiment 26, wherein the base comprises potassium hydroxide, ethanolamine, sodium carbonate, trisodium phosphate dodecahydrate, sodium hydroxide, sodium sesquicarbonate, lithium hydroxide, lithium carbonate, potassium carbonate, or a combination thereof.

29. The method of embodiment 26, wherein the pH of the combined hematoxylin waste solution and cleaning composition is 10.0 or above.

30. The method of embodiment 26, wherein the cleaning composition is added continuously to the hematoxylin waste solution.

31. The method of embodiment 26, wherein the method is performed in an automated slide stainer.

32. The method of embodiment 31, wherein the automated slide stainer comprises a waste tray as a reservoir for the hematoxylin waste solution, wherein the cleaning composition is dispensed into the waste tray.

33. The method of embodiment 32, wherein the cleaning composition is added to the waste tray via a dispenser.

34. An automated method for reducing precipitate in a hematoxylin waste solution, said method comprising introducing a cleaning composition to the hematoxylin waste solution, said cleaning composition comprising an oxidizing agent and a base, the oxidizing agent is selected from the group consisting of hydrogen peroxide, urea peroxide, sodium persulfate, potassium persulfate, ammonium persulfate, sodium perborate, sodium percarbonate, sodium chlorate, peracetate solution, sodium hypochlorite, and potassium bromate, and the base is selected from the group consisting of potassium hydroxide, ethanolamine, sodium carbonate, trisodium phosphate dodecahydrate, sodium hydroxide, sodium sesquicarbonate, lithium hydroxide, lithium carbonate, and potassium carbonate; wherein when combined the hematoxylin waste solution and cleaning composition have a pH of 9.0 or above, wherein said method is performed in an automated slide stainer.

35. A cleaning composition for reducing precipitate in hematoxylin waste solution, said composition comprising an oxidizing agent and a base, the oxidizing agent is selected from the group consisting of hydrogen peroxide, urea peroxide, sodium persulfate, potassium persulfate, ammonium persulfate, sodium perborate, sodium percarbonate, sodium chlorate, peracetate solution, sodium hypochlorite, and potassium bromate, and the base is selected from the group consisting of potassium hydroxide, ethanolamine, sodium carbonate, trisodium phosphate dodecahydrate, sodium hydroxide, sodium sesquicarbonate, lithium hydroxide, lithium carbonate, and potassium carbonate; wherein the cleaning composition is adapted to adjust the pH of the hematoxylin waste solution to 9.0 or above.

36. The cleaning composition of embodiment 35, wherein the cleaning composition is adapted to adjust the pH of the hematoxylin waste solution to 9.5 more.

37. The cleaning composition of embodiment 35, wherein the cleaning composition is adapted to adjust the pH of the hematoxylin waste solution to 10 more.

38. The cleaning composition of embodiment 35, wherein the cleaning composition causes the precipitate to dissolve.

39. An automated slide stainer capable of performing a method according to any of embodiments 26-34.

40. An automated slide stainer comprising a processor and a memory coupled to the processor, the memory stores computer-readable instructions that, when executed by the processor, cause the processor to perform operations comprising instructing the slide stainer to incubate introduce a cleaning composition according to any of embodiments 35-38 to a hematoxylin waste solution.

41. The automated slide stainer of embodiment 40, wherein the cleaning composition causes the precipitate in the hematoxylin waste solution to dissolve.

42. The automated slide stainer of embodiment 40, wherein the pH of the combined hematoxylin waste solution and cleaning composition is 9.5 or more.

43. The automated slide stainer of embodiment 40, wherein the pH of the combined hematoxylin waste solution and cleaning composition is 10.0 or more.

44. The automated slide stainer of embodiment 40, wherein the cleaning composition is added continuously to the hematoxylin waste solution.

45. The automated slide stainer of embodiment 40, wherein the automated slide stainer comprises a waste tray as a reservoir for the hematoxylin waste solution, wherein the cleaning composition is dispensed into the waste tray.

46. The automated slide stainer of embodiment 45, wherein the cleaning composition is added to the waste tray via a dispenser.

47. A system comprising:
a. a waste tray for hematoxylin waste solution;
b. a cleaning composition reservoir adapted to dispense a cleaning solution into the waste tray; and
c. a control module adapted to instruct (b) to perform a method according to any of embodiments 26-34.

48. The system of embodiment 47, wherein the system comprises an automated slide stainer according to any of embodiments 39-46.

49. A method of reducing precipitate in a hematoxylin waste solution, said method comprising introducing a cleaning composition to the hematoxylin waste solution, said cleaning composition comprising a chelator or complexing agent, wherein when combined the hematoxylin waste solution and cleaning composition have a pH of 2 or above.

50. The method of embodiment 49, wherein the chelator or complexing agent comprises ethylenediaminetetraacetic acid (EDTA), ethylene glycol tettraacetic acid (EGTA), diethylene triamine pentaacetic acid (DTPA), sodium fluoride, citrate, tartrate, sulfosalicylic acid, 8-hydroxy quinoline, iminodiacetic acid (IDA), trans-1,2-cyclohexanediaminetetraacetic acid (CDTA), ethylenediamine-N,N'-disuccinic acid (EDDS), phosphate, Tiron, or a combination thereof.

51. The method of embodiment 49, wherein the method causes the precipitate in the hematoxylin waste solution to dissolve.

52. The method of embodiment 49, wherein the pH of the combined hematoxylin waste solution and cleaning composition is from 4 to 9.

53. The method of embodiment 49, wherein the cleaning composition is added continuously to the hematoxylin waste solution.

54. The method of embodiment 49, wherein the method is performed in an automated slide stainer.

55. The method of embodiment 54, wherein the automated slide stainer comprises a waste tray as a reservoir for the hematoxylin waste solution, wherein the cleaning composition is dispensed into the waste tray.

56. The method of embodiment 55, wherein the cleaning composition is added to the waste tray via a dispenser.

57. An automated method for reducing precipitate in a hematoxylin waste solution, said method comprising introducing a cleaning composition to the hematoxylin waste solution, said cleaning composition comprising a chelator or complexing agent selected from the group consisting of ethylenediaminetetraacetic acid (EDTA), ethylene glycol tettraacetic acid (EGTA), diethylene triamine pentaacetic acid (DTPA), sodium fluoride, citrate, tartrate, sulfosalicylic acid, 8-hydroxy quinoline, iminodiacetic acid (IDA), trans-1,2-cyclohexanediaminetetraacetic acid (CDTA), ethylenediamine-N,N'-disuccinic acid (EDDS), Tiron, and phosphate; wherein when combined the hematoxylin waste solution and cleaning composition have a pH of 2 or above, wherein said method is performed in an automated slide stainer.

58. A cleaning composition for reducing precipitate in hematoxylin waste solution, said composition comprising a chelator or complexing agent selected from the group consisting of phosphoric acid, phosphate buffer, phosphate buffer and propylene glycol, hydrofluoric acid, sodium fluoride, Sulfosalicylic acid, Ethylenediamine-N,N'-disuccinic acid (EDDS), Tiron, citrate, and tartrate.

59. The cleaning composition of embodiment 58, wherein the cleaning composition adjusts the pH of the hematoxylin waste solution to a pH between 5 and 9.

60. The cleaning composition of embodiment 58, wherein the cleaning composition adjusts the pH of the hematoxylin waste solution to a pH between 6 and 8.

61. The cleaning composition of embodiment 58, wherein the cleaning composition causes the precipitate to dissolve.

62. An automated slide stainer capable of performing a method according to any of embodiments 49-57.

63. An automated slide stainer comprising a processor and a memory coupled to the processor, the memory stores computer-readable instructions that, when executed by the processor, cause the processor to perform operations comprising instructing the slide stainer to incubate introduce a cleaning composition according to any of embodiments 58-61, wherein when combined the hematoxylin waste solution and cleaning composition have a pH of 2 or above.

64. The automated slide stainer of embodiment 63, wherein the chelator or complexing agent is selected from the group consisting of phosphoric acid, phosphate buffer, phosphate buffer and propylene glycol, hydrofluoric acid, sodium fluoride, Sulfosalicylic acid, Ethylenediamine-N,N'-disuccinic acid (EDDS), Tiron, citrate, and tartrate.

65. The automated slide stainer of embodiment 63, wherein the cleaning composition causes the precipitate in the hematoxylin waste solution to dissolve.

66. The automated slide stainer of embodiment 63, wherein the pH of the combined hematoxylin waste solution and cleaning composition is from 6 to 8.

67. The automated slide stainer of embodiment 63, wherein the cleaning composition is added continuously to the hematoxylin waste solution.

68. The automated slide stainer of embodiment 63, wherein the automated slide stainer comprises a waste tray as a reservoir for the hematoxylin waste solution, wherein the cleaning composition is dispensed into the waste tray.

69. The automated slide stainer of embodiment 68, wherein the cleaning composition is added to the waste tray via a dispenser.

70. A system comprising:
a. a waste tray for hematoxylin waste solution;
b. a cleaning composition reservoir adapted to dispense a cleaning solution into the waste tray; and
c. a control module adapted to instruct (b) to perform a method according to any of embodiments 49-57.

71. The system of embodiment 70, wherein the system comprises an automated slide stainer according to any of embodiments 63-70.

72. A method of reducing precipitate in a hematoxylin waste solution, said method comprising introducing a cleaning composition to the hematoxylin waste solution, said cleaning composition comprising a salt, wherein when the hematoxylin waste solution and cleaning composition are combined the precipitate in the hematoxylin waste solution dissolves.

73. The method of embodiment 72, wherein the salt is selected from the group consisting of potassium aluminum sulfate, and ferric chloride.

74. The method of embodiment 72, wherein the cleaning composition is added continuously to the hematoxylin waste solution.

75. The method of embodiment 72, wherein the method is performed in an automated slide stainer.

76. The method of embodiment 75, wherein the automated slide stainer comprises a waste tray as a reservoir for the hematoxylin waste solution, wherein the cleaning composition is dispensed into the waste tray.

77. The method of embodiment 76, wherein the cleaning composition is added to the waste tray via a dispenser.

78. An automated method for reducing precipitate in a hematoxylin waste solution, said method comprising introducing a cleaning composition to the hematoxylin waste solution, said cleaning composition comprising a salt selected from the group consisting of potassium aluminum sulfate, and ferric chloride, wherein when the hematoxylin waste solution and cleaning composition are combined the precipitate in the hematoxylin waste solution dissolves, wherein said method is performed in an automated slide stainer.

79. A cleaning composition for reducing precipitate in hematoxylin waste solution, said cleaning composition comprising a salt selected from the group consisting of potassium aluminum sulfate, and ferric chloride.

80. The cleaning composition of embodiment 79, wherein the cleaning composition causes the precipitate to dissolve.

81. An automated slide stainer capable of performing a method according to any of embodiments 72-78.

82. An automated slide stainer comprising a processor and a memory coupled to the processor, the memory stores computer-readable instructions that, when executed by the processor, cause the processor to perform operations comprising instructing the slide stainer to incubate introduce a cleaning composition to a hematoxylin waste solution, said cleaning composition comprising a salt, wherein when the hematoxylin waste solution and cleaning composition are combined the precipitate in the hematoxylin waste solution dissolves.

83. The automated slide stainer of embodiment 82, wherein the salt is selected from the group consisting of potassium aluminum sulfate, and ferric chloride.

84. The automated slide stainer of embodiment 82, wherein the cleaning composition is added continuously to the hematoxylin waste solution.

85. The automated slide stainer of embodiment 82, wherein the automated slide stainer comprises a waste tray as a reservoir for the hematoxylin waste solution, wherein the cleaning composition is dispensed into the waste tray.

86. The automated slide stainer of embodiment 85, wherein the cleaning composition is added to the waste tray via a dispenser.

87. A system comprising:
a. a waste tray for hematoxylin waste solution;
b. a cleaning composition reservoir adapted to dispense a cleaning solution into the waste tray; and
c. a control module adapted to instruct (b) to perform a method according to any of embodiments 72-78.

88. The system of embodiment 87, wherein the system comprises an automated slide stainer according to any of embodiments 81-86.

89. A method of reducing precipitate in a hematoxylin waste solution, said method comprising introducing a cleaning composition to the hematoxylin waste solution, said cleaning composition comprising a reducing agent, wherein when the hematoxylin waste solution and cleaning composition are combined the precipitate in the hematoxylin waste solution dissolves.

90. The method of embodiment 89, wherein the reducing agent is selected from the group consisting of sodium dithionite and sodium thiosulfate.

91. The method of embodiment 89, wherein the cleaning composition is added continuously to the hematoxylin waste solution.

92. The method of embodiment 89, wherein the method is performed in an automated slide stainer.

93. The method of embodiment 92, wherein the automated slide stainer comprises a waste tray as a reservoir for the hematoxylin waste solution, wherein the cleaning composition is dispensed into the waste tray.

94. The method of embodiment 93, wherein the cleaning composition is added to the waste tray via a dispenser.

95. An automated method for reducing precipitate in a hematoxylin waste solution, said method comprising introducing a cleaning composition to the hematoxylin waste solution, said cleaning composition comprising a reducing agent selected from the group consisting of sodium dithionite and sodium thiosulfate; wherein when the hematoxylin waste solution and cleaning composition are combined the precipitate in the hematoxylin waste solution dissolves, wherein said method is performed in an automated slide stainer.

96. A cleaning composition for reducing precipitate in hematoxylin waste solution, said cleaning composition comprising a reducing agent selected from the group consisting of sodium dithionite and sodium thiosulfate.

97. The cleaning composition of embodiment 96, wherein the cleaning composition causes the precipitate to dissolve.

98. An automated slide stainer capable of performing a method according to any of embodiments 89-95.

99. An automated slide stainer comprising a processor and a memory coupled to the processor, the memory stores computer-readable instructions that, when executed by the processor, cause the processor to perform operations comprising instructing the slide stainer to incubate introduce a cleaning composition to a hematoxylin waste solution, said cleaning composition comprising a reducing agent, wherein when the hematoxylin waste solution and cleaning composition are combined the precipitate in the hematoxylin waste solution dissolves.

100. The automated slide stainer of embodiment 99, wherein the reducing agent comprises sodium dithionite or sodium thiosulfate.

101. The automated slide stainer of embodiment 99, wherein the cleaning composition is added continuously to the hematoxylin waste solution.

102. The automated slide stainer of embodiment 99, wherein the automated slide stainer comprises a waste tray as a reservoir for the hematoxylin waste solution, wherein the cleaning composition is dispensed into the waste tray.

103. The automated slide stainer of embodiment 102, wherein the cleaning composition is added to the waste tray via a dispenser.

104. A system comprising:
   a. a waste tray for hematoxylin waste solution;
   b. a cleaning composition reservoir adapted to dispense a cleaning solution into the waste tray; and
   c. a control module adapted to instruct (b) to perform a method according to any of embodiments 89-95.

105. The system of embodiment 104, wherein the system comprises an automated slide stainer according to any of embodiments 98-103.

106. A method of reducing precipitate in a hematoxylin waste solution, said method comprising introducing a cleaning composition to the hematoxylin waste solution, said cleaning composition comprising two or more of: (a) an acid; (b) an oxidizing agent; (c) an oxidizing agent and a base; (d) a metal complexing agent or a chelating agent; (e) a metal salt; and (f) a reducing agent, wherein when the hematoxylin waste solution and cleaning composition are combined the precipitate in the hematoxylin waste solution dissolves.

107. The method of embodiment 106, wherein the acid comprises hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, malic acid, or a combination thereof;
the oxidizing agent comprises hydrogen peroxide, urea peroxide, sodium persulfate, potassium persulfate, ammonium persulfate, sodium perborate, sodium percarbonate, sodium chlorate, peracetate solution, sodium hypochlorite, potassium bromate, or a combination thereof; the base comprises potassium hydroxide, ethanolamine, sodium carbonate, trisodium phosphate dodecahydrate, sodium hydroxide, sodium sesquicarbonate, lithium hydroxide, lithium carbonate, potassium carbonate, or a combination thereof; the complexing agent or chelating agent comprises ethylenediaminetetraacetic acid (EDTA), ethylene glycol tetraacetic acid (EGTA), diethylene triamine pentaacetic acid (DTPA), sodium fluoride, citrate, tartrate, sulfosalicylic acid, 8-hydroxy quinoline, iminodiacetic acid (IDA), trans-1,2-cyclohexanediaminetetraacetic acid (CDTA), ethylenediamine-N,N'-disuccinic acid (EDDS), Tiron, phosphate, or a combination thereof; the metal salt comprises potassium aluminum sulfate, ferric chloride, or a combination thereof; and the reducing agent comprises sodium dithionite, sodium thiosulfate, or a combination thereof.

108. The method of embodiment 106, wherein the cleaning composition is added continuously to the hematoxylin waste solution.

109. The method of embodiment 106, wherein the method is performed in an automated slide stainer.

110. A method of reducing precipitate or inhibiting precipitate formation in an automated stainer machine, said method comprising introducing a cleaning composition into or onto a component of the automated stainer machine that is least partially coated with a precipitate derived from a hematoxylin waste solution or a component of the automated stainer that comes in contact with a hematoxylin waste solution, the cleaning composition is adapted to reduce the presence of precipitate or inhibit formation of precipitate derived from the hematoxylin waste solution in or on the component of the automated stainer machine.

111. The method of embodiment 110, wherein the cleaning composition comprises a composition of any of embodiments 11-14, 35-38, 58-61, 79-80, or 96-97.

112. The method of embodiment 110, wherein the cleaning composition is specifically formulated based on the composition of the hematoxylin waste solution.

113. The method of embodiment 110, wherein the component of the automated stainer machine comprises a tube, a valve, a tray, a pump, or a container.

114. The method of embodiment 113, wherein the container comprises a waste container or waste reservoir.

115. The method of embodiment 113, wherein the tube comprises a drainage tube or a waste line.

116. The method of embodiment 113, wherein the pump comprises a waste reservoir pump.

117. The method of embodiment 110, wherein the cleaning composition is introduced continuously into or onto the component of the automated stainer.

118. The method of embodiment 100, wherein the cleaning composition is introduced into or onto the component of the automated stainer at regular or irregular intervals.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The disclosures of the documents are incorporated in their entirety by reference herein: U.S. Pat. No. 8,551,731; U.S. Pat. Application No. 2013/0302852; U.S. Pat. Application No. 2013/0203109; *Proceedings of the American Microscopical Society*, Vol. 14, No. 2, Fifteenth Annual Meeting. Part II (January, 1893), pp. 125-127.

The reference numbers recited in the below claims are solely for ease of examination of this patent application, and are exemplary, and are not intended in any way to limit the scope of the claims to the particular features having the corresponding reference numbers in the drawings.

The invention claimed is:

1. A method of inhibiting formation of a hematoxylin precipitate in a hematoxylin solution, or dissolving the hematoxylin precipitate within an automated stainer, the automated stainer adapted to stain a biological sample with the hematoxylin solution, the method comprising mixing the hematoxylin solution with a cleaning composition, the cleaning composition comprising one or more elements selected from the group consisting of:
    (a) an aluminum chelator or complexing agent, wherein when combined the hematoxylin solution and cleaning composition have a pH of 2 or above; and
    (b) an acid, wherein when combined the hematoxylin waste solution and cleaning composition have a pH from 2.0 to 3.5;
    (c) an oxidizing agent and optionally a base;
    (d) a metal salt,
    wherein the cleaning composition and the hematoxylin solution are mixed at a ratio that results in a concentration of the one or more elements sufficient to inhibit formation of the hematoxylin precipitate or dissolve the hematoxylin precipitate, and wherein the cleaning composition is delivered through a cleaning system adapted to place the hematoxylin solution in contact with the cleaning composition only after the hematoxylin solution has been used to stain the biological sample.

2. The method of claim 1, wherein the cleaning composition comprises the aluminum chelator or aluminum complexing agent, and wherein the aluminum chelator or aluminum complexing agent is selected from the group consisting of ethylenediaminetetraacetic acid (EDTA), ethylene glycol tettraacetic acid (EGTA), diethylene triamine pentaacetic acid (DTPA), sodium fluoride, citrate, tartrate, sulfosalicylic acid, 8-hydroxy quinoline, iminodiacetic acid (IDA), trans-1,2-cyclohexanediaminetetraacetic acid (CDTA), ethylenediamine-N,N'-disuccinic acid (EDDS), phosphate, Tiron, and combinations thereof.

3. The method of claim 1, wherein the cleaning composition comprises the aluminum chelator or aluminum complexing agent, and wherein the aluminum chelator or aluminum complexing agent is selected from the group consisting of phosphoric acid, phosphate buffer, phosphate buffer and propylene glycol, hydrofluoric acid, sodium fluoride, Sulfosalicylic acid, Ethylenediamine-N,N'-disuccinic acid (EDDS), Tiron, citrate, and tartrate.

4. The method of claim 1, wherein the cleaning composition comprises the aluminum chelator or aluminum complexing agent and further wherein the pH of the combined hematoxylin solution and cleaning composition is from 4 to 9.

5. The method of claim 1, wherein the cleaning composition comprises the acid, and wherein the acid is selected from the group consisting of hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, malic acid, and a combination thereof.

6. The method of claim 1, wherein an acid is combined with the hematoxylin solution at a ratio sufficient to obtain a pH in the range of 2.0 to 3.3.

7. The method of claim 6, wherein the pH is from 2.0 to 3.1.

8. The method of claim 1, wherein the cleaning composition comprises the oxidizing composition and optionally comprises the base, and further wherein:
    the oxidizing agent is selected from the group consisting of hydrogen peroxide, urea peroxide, sodium persulfate, potassium persulfate, ammonium persulfate, sodium perborate, sodium percarbonate, sodium chlorate, peracetate solution, sodium hypochlorite, potassium bromate, and combinations thereof; and
    if present, the base is selected from the group consisting of potassium hydroxide, ethanolamine, sodium carbonate, trisodium phosphate dodecahydrate, sodium hydroxide, sodium sesquicarbonate, lithium hydroxide, lithium carbonate, potassium carbonate, and combinations thereof.

9. The method of claim 8, wherein the cleaning composition and the hematoxylin solution are combined at a ratio sufficient to obtain a pH of 9.0 or above.

10. The method of claim 1, wherein the cleaning composition comprises the metal salt, and wherein the metal salt is potassium aluminum sulfate or ferric chloride.

11. The method of claim 1, wherein the automated slide stainer further comprises:
    a hematoxylin waste system adapted to remove the hematoxylin solution from the staining system and optionally to store the hematoxylin solution after the hematoxylin solution has been used to stain the biological sample,
    wherein the cleaning system is adapted to dispense the cleaning composition into the hematoxylin waste system.

12. The method of claim 11, wherein the cleaning composition is dispensed into the hematoxylin waste system before the hematoxylin waste system removes the hematoxylin solution from the staining system.

13. The method of claim 11, wherein the cleaning composition is dispensed into the hematoxylin waste system at the same time that the hematoxylin waste system removes the hematoxylin solution from the staining system.

14. The method of claim 11, wherein the cleaning composition is dispensed into the hematoxylin waste system between separate removals of the hematoxylin solution from the staining system by the hematoxylin waste system.

15. The method of claim 11, wherein the cleaning composition is dispensed into the hematoxylin waste system after the hematoxylin waste system removes the hematoxylin solution from the staining system.

16. The method of claim 11, wherein the hematoxylin waste system comprises a reservoir for storing the hematoxylin waste solution, and wherein at least a portion of the cleaning composition is dispensed directly into the reservoir.

17. The method of claim 11, wherein the hematoxylin waste system comprises a fluid channel for transferring the hematoxylin solution away from the staining system, and wherein at least a portion of the cleaning composition is dispensed directly into the fluid channel.

18. A method of removing hematoxylin precipitate and/or inhibiting hematoxylin precipitate formation in an automated hematoxylin stainer, the method comprising contacting a component of the automated hematoxylin stainer that comes in contact with a hematoxylin solution with one or more elements selected from the group consisting of:
    (c1) an aluminum chelator or complexing agent; and
    (c2) an acid;

(c3) an oxidizing agent and optionally a base; and
(c4) a metal salt;
wherein a hematoxylin precipitate is deposited on at least a portion of the component of the automated hematoxylin stainer, and wherein a sufficient quantity of the element(s) is contacted with the component of the automated hematoxylin stainer to dissolve the hematoxylin precipitate.

19. The method of claim 18, wherein the aluminum chelator or the aluminum complexing agent is selected from the group consisting of ethylenediaminetetraacetic acid (EDTA), ethylene glycol tettraacetic acid (EGTA), diethylene triamine pentaacetic acid (DTPA), sodium fluoride, citrate, tartrate, sulfosalicylic acid, 8-hydroxy quinoline, iminodiacetic acid (IDA), trans-1,2-cyclohexanediaminetetraacetic acid (CDTA), ethylenediamine-N,N'-disuccinic acid (EDDS), phosphate, Tiron, or a combination thereof.

20. The method of claim 18, wherein the aluminum chelator or the aluminum complexing agent is contacted with the component of the automated stainer under conditions in which the aluminum chelator or the aluminum complexing agent has a higher affinity for aluminum than hematein.

21. The method of claim 20, wherein the conditions include a pH of greater than 2.

22. The method of claim 21, wherein the pH is from 4 to 9.

23. The method of claim 18, wherein a sufficient quantity of the acid is contacted with the component of the automated hematoxylin stainer to expose the component to a pH in the range of 2.0 to 3.3.

24. The method of claim 21, wherein the pH is from 2.0 to 3.1.

25. The method of claim 23, wherein the acid is selected from the group consisting of hydrochloric acid, sulfuric acid, nitric acid, phosphoric acid, formic acid, fumaric acid, malonic acid, acetic acid, oxalic acid, perchloric acid, hydrobromic acid, hydroiodic acid, citric acid, tartaric acid, sulfamic acid, succinic acid, glutaric acid, maleic acid, malic acid, and a combination thereof.

26. The method of claim 18, wherein the oxidizing agent and the optional base are contacted with the component of the automated hematoxylin stainer at a pH of 9.0 or above.

27. The method of claim 26, wherein the pH is 10 or above.

28. The method of claim 26, wherein:
the oxidizing agent is selected from the group consisting of hydrogen peroxide, urea peroxide, sodium persulfate, potassium persulfate, ammonium persulfate, sodium perborate, sodium percarbonate, sodium chlorate, peracetate solution, sodium hypochlorite, potassium bromate, and combinations thereof; and
if present, the base is selected from the group consisting of potassium hydroxide, ethanolamine, sodium carbonate, trisodium phosphate dodecahydrate, sodium hydroxide, sodium sesquicarbonate, lithium hydroxide, lithium carbonate, potassium carbonate, and combinations thereof.

29. The method of claim 18, wherein the metal salt is potassium aluminum sulfate or ferric chloride.

* * * * *